(12) United States Patent
Tojo et al.

(10) Patent No.: US 8,158,212 B2
(45) Date of Patent: *Apr. 17, 2012

(54) INK COMPOSITION, INKJET RECORDING METHOD, AND PRINTED MATERIAL

(75) Inventors: Kaoru Tojo, Ashigarakami-gun (JP); Hironori Ohnishi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 1097 days.

This patent is subject to a terminal disclaimer.

(21) Appl. No.: 12/032,243

(22) Filed: Feb. 15, 2008

(65) Prior Publication Data

US 2008/0286484 A1  Nov. 20, 2008

(30) Foreign Application Priority Data

Feb. 19, 2007 (JP) .................................. 2007-038190

(51) Int. Cl.
*C09D 11/00* (2006.01)
*B05D 1/00* (2006.01)

(52) U.S. Cl. ................ 427/466; 522/8; 522/10; 522/75; 522/83; 522/167; 522/14; 522/26; 427/511; 430/281.1

(58) Field of Classification Search ............. 522/78, 522/167, 96, 97, 103, 107, 8, 10, 16, 26, 522/75, 83; 523/160; 524/548; 526/264; 427/466, 511; 430/282.1, 281.1
See application file for complete search history.

(56) References Cited

U.S. PATENT DOCUMENTS

| | | | |
|---|---|---|---|
| 5,395,863 A | 3/1995 | Burns et al. | |
| 6,534,128 B1 * | 3/2003 | Carlson et al. | 427/466 |
| 6,558,753 B1 * | 5/2003 | Ylitalo et al. | 427/466 |
| 7,423,072 B2 * | 9/2008 | Lee et al. | 522/96 |
| 7,553,605 B2 * | 6/2009 | Hayata et al. | 430/286.1 |
| 7,635,504 B2 * | 12/2009 | Elwakil et al. | 427/466 |
| 7,713,462 B2 * | 5/2010 | Hayata et al. | 264/447 |
| 2002/0086914 A1 | 7/2002 | Lee et al. | |
| 2003/0083396 A1 | 5/2003 | Ylitalo et al. | |

FOREIGN PATENT DOCUMENTS

| | | |
|---|---|---|
| EP | 1 642 943 A2 | 4/2006 |
| EP | 1 882 724 A1 | 1/2008 |
| EP | 1 903 080 A1 | 3/2008 |
| JP | 2880845 B2 | 8/1999 |
| JP | 2004-514014 A | 5/2004 |
| JP | 2006-299117 A | 11/2006 |
| WO | 02/38688 A2 | 5/2002 |
| WO | 2005/026270 A1 | 3/2005 |

OTHER PUBLICATIONS

European Search Report dated May 19, 2008.

* cited by examiner

*Primary Examiner* — Susan W Berman
(74) *Attorney, Agent, or Firm* — Sughrue Mion, PLLC

(57) ABSTRACT

An ink composition is provided that includes (A) an N-vinyllactam, (B) another polymerizable compound, (C) a polymerization initiator, and (D) a basic compound, the content of the N-vinyllactam (A) being less than 15 wt % of the total weight of the ink composition. There is also provided an inkjet recording method that includes ($a^1$) a step of discharging the ink composition onto a recording medium and ($b^1$) a step of curing the ink composition by irradiating the discharged ink composition with actinic radiation. There is also provided a printed material recorded by the inkjet recording method.

22 Claims, No Drawings

INK COMPOSITION, INKJET RECORDING METHOD, AND PRINTED MATERIAL

BACKGROUND OF THE INVENTION

1. Field of the Invention

The present invention relates to an ink composition suitably used for inkjet recording, an inkjet recording method and, furthermore, and a printed material obtained by employing the ink composition.

2. Description of the Related Art

With regard to an image recording method for forming an image on a recording medium such as paper based on an image data signal, there are an electrophotographic system, sublimation type and melt type thermal transfer systems, an inkjet system, etc. In the electrophotographic system, a process of forming an electrostatic latent image on a photosensitive drum by electrically charging and exposing is required, and the system is complicated; as a result, there is the problem that the production cost is high. With regard to the thermal transfer system, although the equipment is inexpensive, due to the use of an ink ribbon there is the problem that the running cost is high and waste material is generated.

On the other hand, with regard to the inkjet system, the equipment is inexpensive and, since an image is formed directly on a recording medium by discharging an ink only on a required image area, the ink can be used efficiently and the running cost is low. Furthermore, there is little noise and it is excellent as an image recording system.

BRIEF SUMMARY OF THE INVENTION

As an ink composition that gives a cured film having excellent flexibility and adhesion to a substrate, an ink composition comprising an N-vinyllactam has been disclosed (Japanese Registered Patent No. 2880845). However, the ink composition described in Japanese Registered Patent No. 2880845 is a high viscosity ink composition containing a polymer and an oligomer as main ink components, and it is difficult to discharge by ink jet.

Furthermore, as an ink composition that can be cured by irradiation with radiation such as ultraviolet rays, an ink composition having excellent adhesion has been disclosed (ref. Published Japanese translation No. 2004-514014 of a PCT application).

Moreover, JP-A-2006-299117 (JP-A denotes a Japanese unexamined patent application publication) describes an inkjet ink comprising an acrylate monomer having a dicyclopentenyl group, an N-vinyllactam monomer, another photopolymerizable compound, a photopolymerization initiator, and a colorant.

It is an object of the present invention to provide an ink composition that ensures long-term storage stability, has excellent continuous discharge properties, and for which an image obtained by curing has excellent color hue and adhesion to a substrate, an inkjet recording method employing the ink composition, and a printed material obtained by the inkjet recording method.

The above-mentioned object has been accomplished by <1>, <10> and <12> below. <2> to <9> and <11>, which are preferred embodiments, are also shown below.

<1> An ink composition comprising (A) an N-vinyllactam, (B) another polymerizable compound, (C) a polymerization initiator, and (D) a basic compound, the content of the N-vinyllactam (A) being less than 15 wt % of the total weight of the ink composition, <2> the ink composition according to <1> above, wherein the polymerization initiator (C) comprises a radical polymerization initiator, <3> the ink composition according to either <1> or <2> above, wherein it comprises (E) a radical polymerization inhibitor, <4> the ink composition according to any one of <1> to <3> above, wherein it comprises (F) a colorant and (G) a dispersant, <5> the ink composition according to any one of <1> to <4> above, wherein the N-vinyllactam (A) is N-vinylcaprolactam, <6> the ink composition according to any one of <1> to <5> above, wherein it comprises the colorant (F), and the colorant (F) is titanium oxide, <7> the ink composition according to any one of <1> to <6> above, wherein it comprises the dispersant (G), and the dispersant (G) is an acidic dispersant, <8> the ink composition according to any one of <1> to <7> above, wherein the basic compound (D) is a hindered amine type compound, <9> the ink composition according to any one of <1> to <8> above, wherein it is for inkjet recording, <10> an inkjet recording method comprising ($a^1$) a step of discharging the ink composition according to any one of <1> to <9> above onto a recording medium, and ($b^1$) a step of curing the ink composition by irradiating the discharged ink composition with actinic radiation, <11> the inkjet recording method according to <10> above, wherein the actinic radiation is UV radiation having a peak light emission wavelength in the range of 350 to 420 nm and is emitted by a UV radiation-emitting light-emitting diode that gives a maximum illumination intensity on the surface of a recording medium of 10 to 2,000 mW/cm$^2$, and <12> a printed material recorded by the inkjet recording method according to either <10> or <11>.

DETAILED DESCRIPTION OF THE INVENTION (1) Ink Composition

The ink composition of the present invention (hereinafter, also called simply an 'ink') comprises (A) an N-vinyllactam, (B) another polymerizable compound, (C) a polymerization initiator, and (D) a basic compound, the content of the N-vinyllactam (A) being less than 15 wt % of the total weight of the ink composition.

The present invention is explained in detail below.

The 'radiation' referred to in the present invention is not particularly limited as long as it is actinic radiation that can provide energy that enables an initiating species to be generated in the ink composition when irradiated, and broadly includes α rays, γ rays, X rays, ultraviolet rays (UV), visible light, and an electron beam; among these, ultraviolet rays and an electron beam are preferable from the viewpoint of curing sensitivity and the availability of equipment, and ultraviolet rays are particularly preferable. The ink composition of the present invention is therefore preferably an ink composition that can cure upon exposure to ultraviolet rays as radiation.

(A) N-Vinyllactam

The ink composition of the present invention comprises an N-vinyllactam. Preferred examples of the N-vinyllactam include compounds represented by Formula (I) below. In some of the chemical structures described in the present invention, a hydrocarbon chain is represented by a simplified structural formula in which symbols for carbon (C) and hydrogen (H) are omitted.

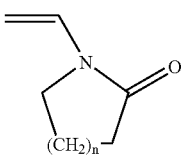

Formula (I)

In Formula (I), n denotes an integer of 1 to 5; n is preferably an integer of 2 to 4 from the viewpoint of flexibility after the ink composition is cured, adhesion to a recording medium, and ready availability of starting materials, n is more preferably 2 or 4, and n is particularly preferably 4, which is N-vinylcaprolactam. N-Vinylcaprolactam is preferable since it has excellent safety, is commonly used and is readily available at a relatively low price, and gives particularly good ink curability and adhesion of a cured film to a recording medium.

The N-vinyllactam may have a substituent such as an alkyl group or an aryl group on the lactam ring, and may have a saturated or unsaturated ring structure bonded to the lactam ring.

The ink composition of the present invention comprises an N-vinyllactam at less than 15 wt % of the total weight of the ink composition. When the content of the N-vinyllactam is 15 wt % or greater, an ink composition having excellent color hue cannot be obtained and, furthermore, since the N-vinyllactam decomposes over time the viscosity and the color hue change. When no N-vinyllactam is contained, an ink composition having excellent continuous discharge properties in inkjet recording and excellent adhesion of a cured film to a recording medium cannot be obtained.

The N-vinyllactams are compounds having a relatively high melting point, and exhibit good solubility at a low temperature of 0° C. or below, and when they are used in an ink composition the temperature range in which they can be handled is wide.

Moreover, the content of the N-vinyllactam in the ink composition is preferably at least 5 wt % but less than 15 wt % of the total weight of the ink composition, and more preferably at least 10 wt % but less than 15 wt %.

The N-vinyllactam may be contained in the ink composition singly or in a combination of a plurality of types thereof.

(B) Other Polymerizable Compound

The ink composition of the present invention employs, as a polymerizable compound, (B) another polymerizable compound in combination in addition to the N-vinyllactam (A).

Examples of the other polymerizable compound (B) that can be used in combination include a radically polymerizable compound and a cationically polymerizable compound, and among them it is preferable to use a radically polymerizable compound in combination. The combined use of a radically polymerizable compound enables an ink composition having better curability to be provided.

The 'radically polymerizable compound' referred to in the present invention naturally means a radically polymerizable compound other than an N-vinyllactam.

Radically Polymerizable Compound

The radically polymerizable compound is a compound having a radically polymerizable ethylenically unsaturated bond, and may be any compound as long as it has at least one radically polymerizable ethylenically unsaturated bond in the molecule; examples thereof include those having a chemical configuration such as a monomer, an oligomer, or a polymer. One type of radically polymerizable compound may be used, or two or more types thereof may be used in combination at any ratio in order to improve an intended property.

As the radically polymerizable compound, photocuring materials employing photopolymerizable compositions described in, for example, JP-A-7-159983, JP-B-7-31399, JP-A-8-224982, JP-A-10-863, JP-A-9-80675, etc. are known (JP-B denotes a Japanese examined patent application publication).

Preferred examples of polymerizable compounds having a radically polymerizable ethylenically unsaturated bond include unsaturated carboxylic acids such as acrylic acid, methacrylic acid, itaconic acid, crotonic acid, isocrotonic acid, and maleic acid, esters thereof, and salts thereof, anhydrides having an ethylenically unsaturated group, acrylonitrile, styrene, and various types of unsaturated polyesters, unsaturated polyethers, unsaturated polyamides, and (meth) acrylic acid esters of unsaturated urethane(meth)acrylic monomers or prepolymers, epoxy monomers or prepolymers, or urethane monomers or prepolymers.

Specific examples thereof include (meth)acrylic acid derivatives such as (poly)ethylene glycol mono(meth)acrylate, (poly)ethylene glycol(meth)acrylate methyl ester, (poly)ethylene glycol(meth)acrylate ethyl ester, (poly)ethylene glycol(meth)acrylate phenyl ester, (poly)propylene glycol mono (meth)acrylate, (poly)propylene glycol mono(meth)acrylate phenyl ester, (poly)propylene glycol(meth)acrylate methyl ester, (poly)propylene glycol(meth)acrylate ethyl ester, (poly)propylene glycol diglycidyl ether acrylic acid adduct, neopentyl glycol di(meth)acrylate, (poly)ethylene glycol di(meth)acrylate, (poly)tetramethylene glycol di(meth)acrylate, (poly)tetramethylene glycol di(meth)acrylate, bisphenol A PO (propylene oxide) adduct di(meth)acrylate, ethoxylated neopentyl glycol diacrylate, propoxylated neopentyl glycol diacrylate, bisphenol A EO (ethylene oxide) adduct di(meth) acrylate, EO-modified pentaerythritol triacrylate, PO-modified pentaerythritol triacrylate, EO-modified pentaerythritol tetraacrylate, PO-modified pentaerythritol tetraacrylate, EO-modified dipentaerythritol tetraacrylate, PO-modified dipentaerythritol tetraacrylate, EO-modified trimethylolpropane triacrylate, PO-modified trimethylolpropane triacrylate, EO-modified tetramethylolmethane tetraacrylate, PO-modified tetramethylolmethane tetraacrylate, 2-ethylhexyl acrylate, n-octyl acrylate, n-nonyl acrylate, n-decyl acrylate, isooctyl acrylate, n-lauryl acrylate, n-tridecyl acrylate, n-cetyl acrylate, n-stearyl acrylate, isomyristyl acrylate, isostearyl acrylate, 2-hydroxyethyl acrylate, butoxyethyl acrylate, tetrahydrofurfuryl acrylate, benzyl acrylate, pentaerythritol triacrylate, pentaerythritol tetraacrylate, dipentaerythritol tetraacrylate, trimethylolpropane triacrylate, tetramethylolmethane tetraacrylate, oligoester acrylate, isoamyl acrylate, N-methylolacrylamide, diacetone acrylamide, epoxy acrylate, methyl methacrylate, n-butyl methacrylate, 2-ethylhexyl methacrylate, n-octyl methacrylate, n-nonyl methacrylate, n-decyl methacrylate, isooctyl methacrylate, n-lauryl methacrylate, n-tridecyl methacrylate, n-cetyl methacrylate, n-stearyl methacrylate, allyl methacrylate, glycidyl methacrylate, benzyl methacrylate, dimethylaminomethyl methacrylate, trimethylolethane trimethacrylate, trimethylolpropane trimethacrylate, 2,2-bis(4-methacryloxypolyethoxyphenyl)propane, 1,6-hexanediol diacrylate, 1,9-nonanediol diacrylate, 1,10-decanediol diacrylate, 2-ethylhexyl diglycol acrylate, 2-hydroxy-3-phenoxypropyl acrylate, 2-hydroxybutyl acrylate, hydroxypivalic acid neopentyl glycol diacrylate, 2-acryloyloxyethylphthalic acid, nonylphenol EO adduct acrylate, methoxy polyethylene glycol acrylate, tetramethylolmethane triacrylate, 2-acryloyloxyethyl-2-hydroxyethylphthalic acid, dimethyloltricyclodecane diacrylate, ethoxylated phenyl acrylate, 2-acryloyloxyethylsuccinic acid, modified glycerol triacrylate, bisphenol A diglycidyl ether acrylic acid adduct, modified bisphenol A diacrylate, phenoxy polyethylene glycol acrylate, 2-acryloyloxyethylhexahydrophthalic acid, dipentaerythritol hexaacrylate, pentaerythritol triacrylate tolylene diisocyanate urethane prepolymer, lactone-modified flexible acrylate, butoxyethyl acrylate, pentaerythritol triacrylate hexamethylene diisocyanate urethane prepolymer, 2-hydroxyethyl acrylate, methoxydipropylene glycol acrylate, ditrimethylolpropane tetraacrylate, and pentaerythritol triacrylate hexamethylene diisocyanate urethane prepolymer, and allyl compound derivatives such as allyl glycidyl ether, diallyl phthalate, and triallyl trimellitate.

More specifically, radically polymerizable or crosslinking monomers, oligomers, and polymers that are commercial products or are industrially known, such as those described in 'Kakyozai Handobukku' (Crosslinking Agent Handbook), Ed. S. Yamashita (Taiseisha, 1981); 'UV•EB Koka Handobukku' (UV•EB Curing Handbook (Starting Materials) Ed. K. Kato (Kobunshi Kankoukai, 1985); 'UV•EB Koka Gijutsu no Oyo to Shijyo' (Application and Market of UV•EB Curing Technology), p. 79, Ed. Rad Tech (CMC, 1989); and E. Takiyama 'Poriesuteru Jushi Handobukku' (Polyester Resin Handbook), (The Nikkan Kogyo Shimbun Ltd., 1988) may be used.

These (meth)acrylate compounds are preferable since the viscosity can be decreased compared with polymerizable compounds conventionally used in a UV-curing ink, stable discharge properties can be obtained, and polymerization sensitivity and adhesion to a recording medium are also good.

It is also preferable to use a vinyl ether compound as the radically polymerizable compound. Examples of vinyl ether compounds that are suitably used include di- or tri-vinyl ether compounds such as ethylene glycol divinyl ether, ethylene glycol monovinyl ether, diethylene glycol divinyl ether, triethylene glycol monovinyl ether, triethylene glycol divinyl ether, propylene glycol divinyl ether, dipropylene glycol divinyl ether, butanediol divinyl ether, hexanediol divinyl ether, cyclohexanedimethanol divinyl ether, hydroxyethyl monovinyl ether, hydroxynonyl monovinyl ether, and trimethylolpropane trivinyl ether; and monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl vinyl ether, dodecyl vinyl ether, diethylene glycol monovinyl ether, and octadecyl vinyl ether.

Among these vinyl ether compounds, from the viewpoint of curability, adhesion, and surface hardness, a divinyl ether compound and a trivinyl ether compound are preferable, and a divinyl ether compound is particularly preferable. The vinyl ether compounds may be used singly or in a combination of two or more types as appropriate.

Furthermore, in the present invention, it is also preferable to use a radically polymerizable compound having a polycyclic structure as the radically polymerizable compound used in combination with the N-vinyllactam.

Specifically, a radically polymerizable compound having a dicyclopentanyl structure, a dicyclopentenyl structure, or an adamantyl structure is preferable. It is preferable to use a radically polymerizable compound having a polycyclic structure since it has high reactivity, low viscosity, and excellent adhesion to a recording medium.

Examples of the radically polymerizable compound having a polycyclic structure that can be used preferably in the present invention are listed below, but the present invention is not limited thereby.

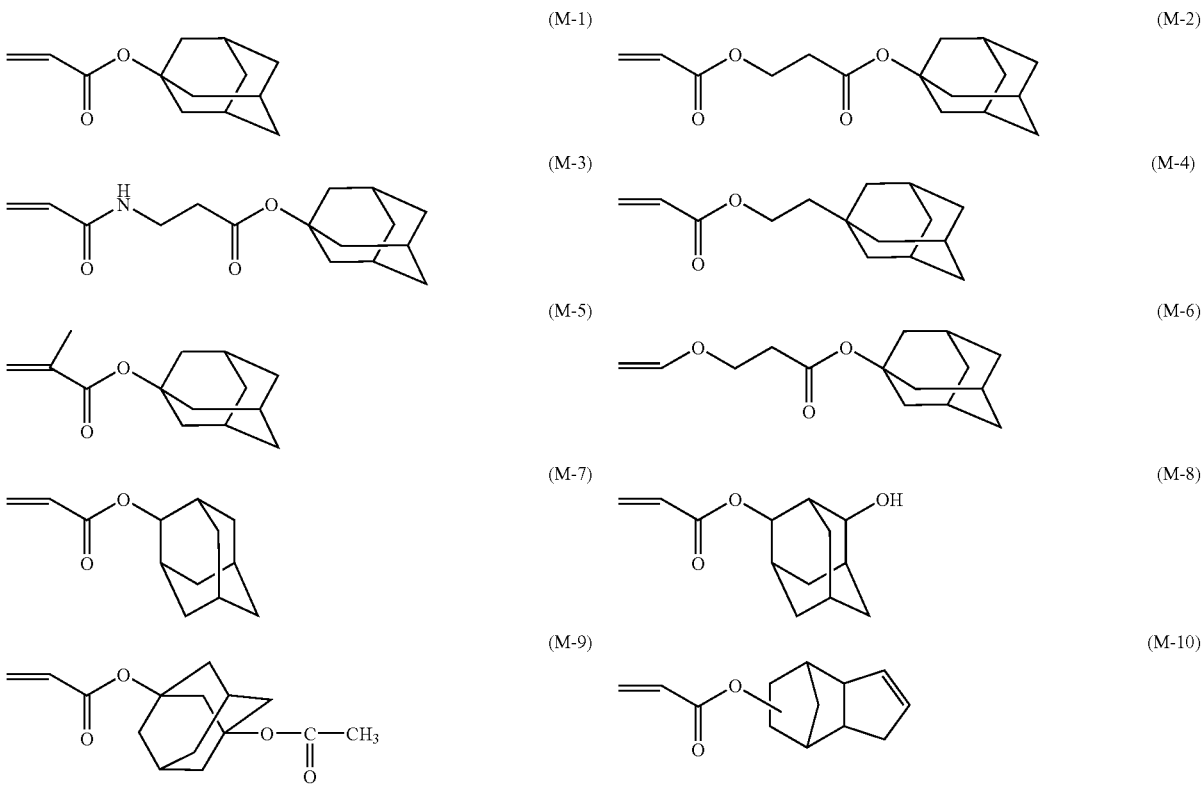

(M-11) 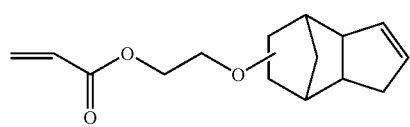
(M-12) 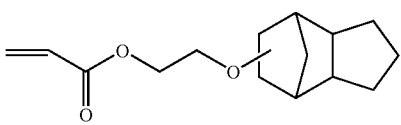
(M-13) 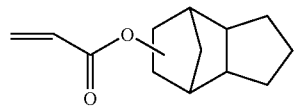
(M-14) 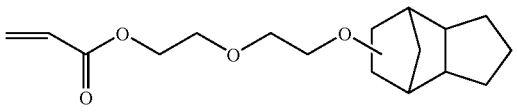
(M-15) 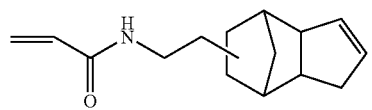
(M-16) 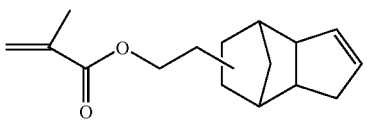
(M-17) 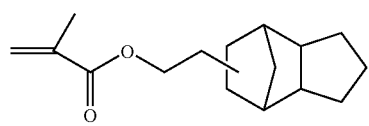
(M-18) 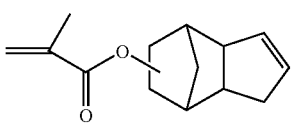
(M-19) 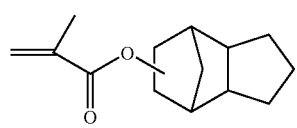
(M-20) 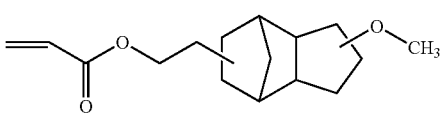
(M-21) 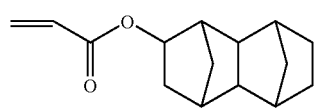
(M-22) 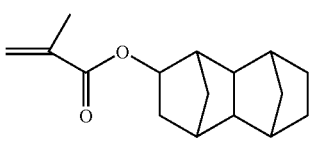
(M-23) 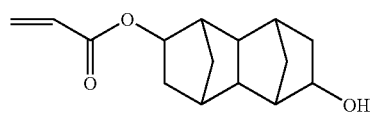
(M-24) 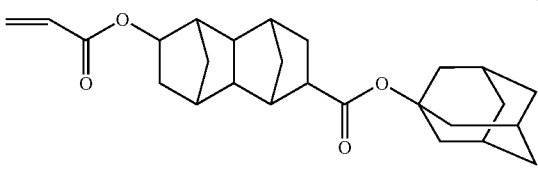
(M-25) 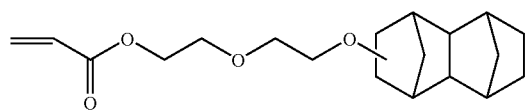
(M-26) 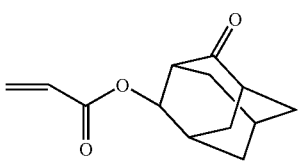
(M-27) 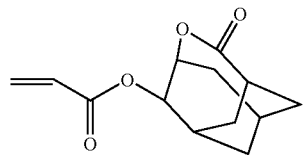
(M-28) 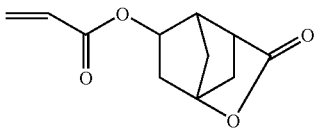
(M-29) 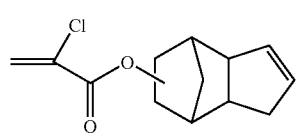
(M-30) 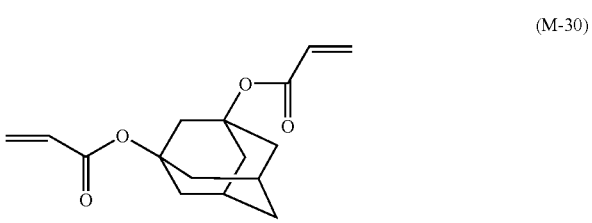

-continued

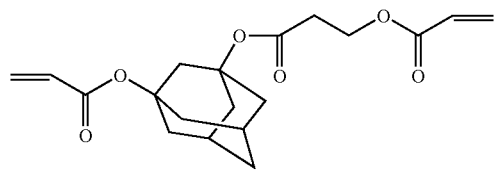
(M-31)

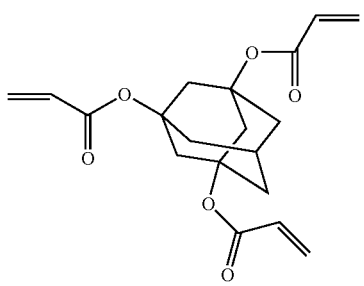
(M-32)

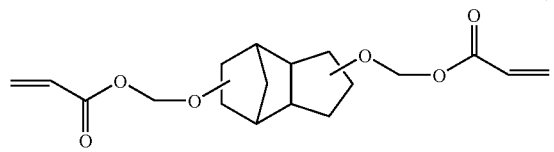
(M-33)

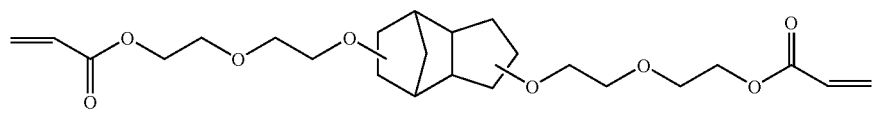
(M-34)

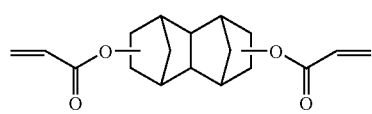
(M-35)

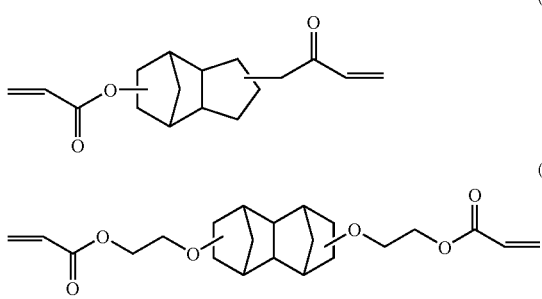
(M-36)

(M-37)

(M-38)

Furthermore, the content of the other polymerizable compound (B) in the ink composition of the present invention is preferably at least 10 wt % but no greater than 80 wt % relative to the total weight of the ink composition, more preferably at least 20 wt % but no greater than 75 wt %, and yet more preferably at least 30 wt % but no greater than 70 wt %. It is preferable for the content to be in the above-mentioned range since the curing is sufficient.

Moreover, a monofunctional acrylate is preferable as the other polymerizable compound (B) in the ink composition of the present invention, from the viewpoints of curability and excellent film physical properties such as flexibility being given to a cured film.

In the present invention, the radically polymerizable compound may be used in combination with an oligomer or a polymer. The oligomer referred to here means a compound having a molecular weight (a weight-average molecular weight for one having a molecular weight distribution) of 2,000 or greater, and the polymer referred to here means a compound having a molecular weight (a weight-average molecular weight for one having a molecular weight distribution) of 10,000 or greater. The oligomer and the polymer optionally have a radically polymerizable group. It is preferable for the oligomer and the polymer to have no more than 4 radically polymerizable groups per molecule (an average of no more than 4 over all the molecules contained for one having a molecular weight distribution) since an ink composition having excellent flexibility can be obtained. They can suitably be used from the viewpoint of adjusting the viscosity to a level most suitable for jetting the ink.

Cationically Polymerizable Compound

The ink composition of the present invention may comprise in combination as necessary a cationic polymerizable compound as the other polymerizable compound (B). When a cationic polymerizable compound is used in combination, it is preferable to use a cationic polymerization initiator in combination as a polymerization initiator.

The cationically polymerizable compound used in the present invention is not particularly limited as long as it is a compound that undergoes a polymerization reaction by virtue of an acid generated by the photo-acid generator and is cured, and various types of cationically polymerizable monomers known as photo-cationically polymerizable monomers may be used. Examples of the cationically polymerizable monomer include epoxy compounds, vinyl ether compounds, oxetane compounds described in JP-A-6-9714, JP-A-2001-31892, JP-A-2001-40068, JP-A-2001-55507, JP-A-2001-310938, JP-A-2001-310937, JP-A-2001-220526, etc.

As the cationically polymerizable compound, for example, a cationically polymerizable type photocuring resin is known, and in recent years cationically photopolymerizable type photocuring resins sensitized to a visible light wavelength region of 400 nm or longer have been disclosed in, for example, JP-A-6-43633 and JP-A-8-324137. They may also be applied to the ink composition of the present invention.

(C) Polymerization Initiator

In the present invention, when the ink is cured using actinic radiation such as ultraviolet rays, it comprises a polymerization initiator. As a polymerization initiator that can be used in the present invention, a known polymerization initiator may be used, and it is preferable to use a radical polymerization initiator. The polymerization initiator that can be used in the present invention may be used singly or in a combination of two or more types. Furthermore, the radical polymerization initiator may be used in combination with a cationic polymerization initiator.

The polymerization initiator that can be used in the ink composition of the present invention is a compound that forms a polymerization initiating species by absorbing external energy. The external energy used for initiating polymerization can be broadly divided into heat and actinic radiation, and a thermal polymerization initiator and a photopolymerization initiator are used respectively. Examples of the actinic radiation include γ rays, β rays, an electron beam, ultraviolet rays, visible light, and infrared rays.

Radical Polymerization Initiator

Examples of the radical polymerization initiator that can be used in the present invention include (a) an aromatic ketone, (b) an acylphosphine compound, (c) an aromatic onium salt compound, (d) an organic peroxide, (e) a thio compound, (f) a hexaarylbiimidazole compound, (g) a ketoxime ester compound, (h) a borate compound, (i) an azinium compound, (j) a metallocene compound, (k) an active ester compound, (l) a compound having a carbon-halogen bond, and (m) an alkylamine compound. With regard to these radical polymerization initiators, the above-mentioned compounds (a) to (m) may be used singly or in combination. The radical polymerization initiator in the present invention may suitably be used singly or in a combination of two or more types.

Preferred examples of the aromatic ketone (a) and the thio compound (e) include a compound having a benzophenone skeleton (benzophenone compound) or a compound having a thioxanthone skeleton (thioxanthone compound) described in 'RADIATION CURING IN POLYMER SCIENCE AND TECHNOLOGY' J. P. FOUASSIER and J. F. RABEK (1993), pp. 77 to 117. Preferred examples of the aromatic ketone (a), the acylphosphine compound (b) and the thio compound (e) include an α-thiobenzophenone compound described in JP-B-47-6416, a benzoin ether compound described in JP-B-47-3981, an α-substituted benzoin compound described in JP-B-47-22326, a benzoin derivative described in JP-B-47-23664, an aroylphosphonic acid ester described in JP-A-57-30704, a dialkoxybenzophenone described in JP-B-60-26483, benzoin ethers described in JP-B-60-26403 and JP-A-62-81345, α-aminobenzophenones described in JP-B-1-34242, U.S. Pat. No. 4,318,791, and EP No. 0284561A1, p-di(dimethylaminobenzoyl)benzene described in JP-A-2-211452, a thio-substituted aromatic ketone described in JP-A-61-194062, an acylphosphine sulfide described in JP-B-2-9597, an acylphosphine described in JP-B-2-9596, a thioxanthone described in JP-B-63-61950, and a coumarin described in JP-B-59-42864.

As the aromatic onium salt compound (c), there can be cited aromatic onium salts of elements of Groups 15, 16, and 17 of the periodic table, specifically, N, P, As, Sb, Bi, O, S, Se, Te, and I. Examples thereof include iodonium salts described in EP No. 104143, U.S. Pat. No. 4,837,124, JP-A-2-150848, and JP-A-2-96514, diazonium salts (optionally substituted benzenediazoniums, etc.) described in EP Nos. 370693, 233567, 297443, 297442, 279210, and 422570, U.S. Pat. Nos. 3,902,144, 4,933,377, 4,760,013, 4,734,444, and 2,833,827, diazonium salt resins (diazodiphenylamine formaldehyde resins, etc.), N-alkoxypyridinium salts, etc. (e.g. those described in U.S. Pat. No. 4,743,528, JP-A-63-138345, JP-A-63-142345, JP-A-63-142346, and JP-B-46-42363; specific examples thereof include 1-methoxy-4-phenylpyridinium tetrafluoroborate); furthermore, compounds described in JP-B-52-147277, 52-14278, and 52-14279 may suitably be used. A radical or an acid is formed as an active species.

As the organic peroxide (d), almost all organic compounds having at least one oxygen-oxygen bond per molecule can be cited, and preferred examples thereof include peroxide ester compounds such as 3,3',4,4'-tetra(t-butylperoxycarbonyl)benzophenone, 3,3',4,4'-tetra(t-amylperoxycarbonyl)benzophenone, 3,3',4,4'-tetra(t-hexylperoxycarbonyl)benzophenone, 3,3',4,4'-tetra(t-octylperoxycarbonyl)benzophenone, 3,3',4,4'-tetra(cumylperoxycarbonyl)benzophenone, 3,3',4,4'-tetra(p-isopropylcumylperoxycarbonyl)benzophenone, and di-t-butyldiperoxyisophthalate.

As the hexaarylbiimidazole compound (f), there can be cited lophine dimers described in JP-B-45-37377 and JP-B-44-86516, and examples thereof include 2,2'-bis(o-chlorophenyl)-4,4',5,5'-tetraphenylbiimidazole, 2,2'-bis(o-bromophenyl)-4,4',5,5'-tetraphenylbiimidazole, 2,2'-bis(o,p-dichlorophenyl)-4,4',5,5'-tetraphenylbiimidazole, 2,2'-bis(o-chlorophenyl)-4,4',5,5'-tetra(m-methoxyphenyl) biimidazole, 2,2'-bis(o,o'-dichlorophenyl)-4,4',5,5'-tetraphenylbiimidazole, 2,2'-bis(o-nitrophenyl)-4,4',5,5'-tetraphenylbiimidazole, 2,2'-bis(o-methylphenyl)-4,4',5,5'-tetraphenylbiimidazole, and 2,2'-bis(o-trifluorophenyl)-4,4',5,5'-tetraphenylbiimidazole.

As the ketoxime ester compound (g), there can be cited 3-benzoyloxyiminobutan-2-one, 3-acetoxyiminobutan-2-one, 3-propionyloxyiminobutan-2-one, 2-acetoxyiminopentan-3-one, 2-acetoxyimino-1-phenylpropan-1-one, 2-benzoyloxyimino-1-phenylpropan-1-one, 3-p-toluenesulfonyloxyiminobutan-2-one, and 2-ethoxycarbonyloxyimino-1-phenylpropan-1-one.

Examples of the borate compound (h) include compounds described in U.S. Pat. Nos. 3,567,453 and 4,343,891, and EP Nos. 109,772 and 109,773.

Examples of the azinium salt compound (I) include N—O bond-containing compounds described in JP-A-63-138345, JP-A-63-142345, JP-A-63-142346, JP-A-63-143537, and JP-B-46-42363.

Examples of the metallocene compound (j) include titanocene compounds described in JP-A-59-152396, JP-A-61-151197, JP-A-63-41484, JP-A-2-249, and JP-A-2-4705, and iron-arene complexes described in JP-A-1-304453 and JP-A-1-152109.

Specific examples of the titanocene compound include dichlorobis(cyclopentadienyl)titanium, bis(cyclopentadienyl)bis(phenyl)titanium, bis(cyclopentadienyl)bis(2,3,4,5,6-pentafluorophen-1-yl)titanium, bis(cyclopentadienyl)bis(2,3,5,6-tetrafluorophen-1-yl)titanium, bis(cyclopentadienyl)bis(2,4,6-trifluorophen-1-yl)titanium, bis(cyclopentadienyl)bis(2,6-difluorophen-1-yl)titanium, bis(cyclopentadienyl)bis(2,4-difluorophen-1-yl)titanium, bis(methylcyclopentadienyl)bis(2,3,4,5,6-pentafluorophen-1-yl)titanium, bis(methylcyclopentadienyl)bis(2,3,5,6-tetrafluorophen-1-yl)titanium, bis(methylcyclopentadienyl) bis(2,4-difluorophen-1-yl)titanium, bis(cyclopentadienyl)bis[2,6-difluoro-3-(pyrr-1-yl)phenyl]titanium, bis(cyclopentadienyl)bis[2,6-difluoro-3-(methylsulfonamido) phenyl]titanium, and bis(cyclopentadienyl)bis[2,6-difluoro-3-(N-butylbiaroylamino)phenyl]titanium.

Examples of the active ester compound (k) include nitrobenzyl ester compounds described in EP Nos. 0290750, 046083, 156153, 271851, and 0388343, U.S. Pat. Nos. 3,901, 710 and 4,181,531, JP-A-60-198538, and JP-A-53-133022, iminosulfonate compounds described in EP Nos. 0199672, 84515, 199672, 044115, and 0101122, U.S. Pat. Nos. 4,618,564, 4,371,605, and 4,431,774, JP-A-64-18143, JP-A-2-245756, and JP-A-4-365048, and compounds described in JP-B-62-6223, JP-B-63-14340, and JP-A-59-174831.

Preferred examples of the compound (I) having a carbon-halogen bond include a compound described in Wakabayashi et. al, Bull. Chem. Soc. Japan, 42, 2924 (1969), a compound described in British Patent No. 1388492, a compound described in JP-A-53-133428, and a compound described in German Patent No. 3337024.

Examples further include a compound described in F. C. Schaefer et al., J. Org. Chem., 29, 1527 (1964), a compound described in JP-A-62-58241, a compound described in JP-A-5-281728, a compound described in German Pat. No. 2641100, a compound described in German Pat. No. 3333450, compounds described in German Pat. No. 3021590, and compounds described in German Pat. No. 3021599.

Cationic Polymerization Initiator

In the ink composition of the present invention, when a cationically polymerizable compound is used in combination, it is preferable to use a cationic polymerization initiator in combination.

Firstly, $B(C_6F_5)_4^-$, $PF_6^-$, $AsF_6^-$, $SbF_6^-$, and $CF_3SO_3^-$ salts of diazonium, ammonium, iodonium, sulfonium, phosphonium, etc. aromatic onium compounds can be cited. Secondly, sulfonated materials that generate a sulfonic acid can be cited. Thirdly, halides that photogenerate a hydrogen halide can also be used. Fourthly, iron arene complexes can be cited.

Examples [(b-1) to (b-96)] of cationic polymerization initiators that are suitably used in the present invention are listed below, but the present invention should not be construed as being limited thereby.

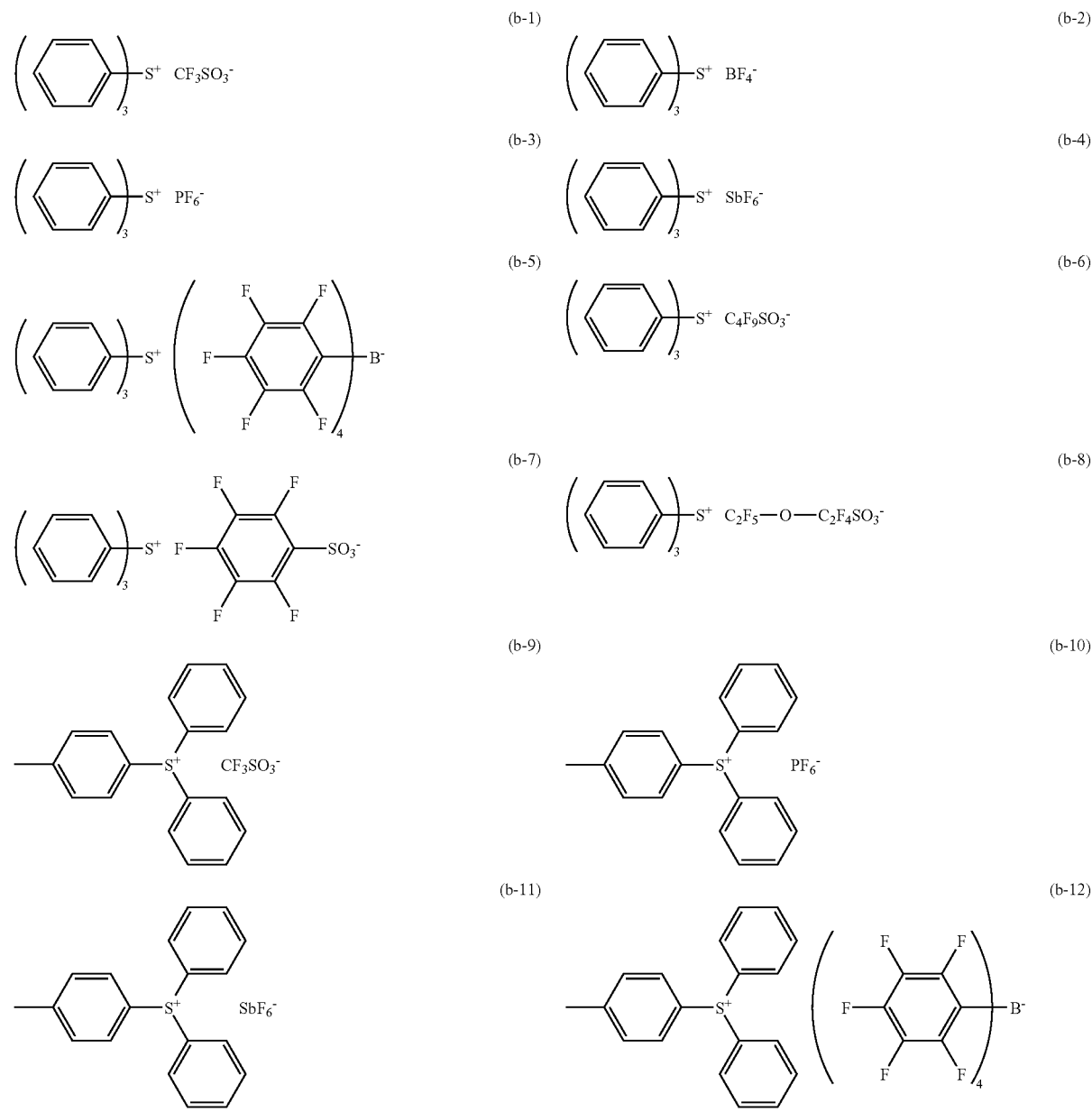

-continued
(b-13)
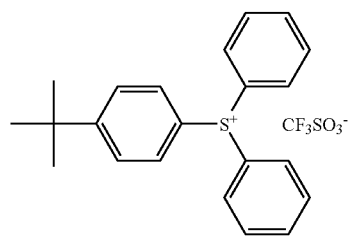
(b-14)
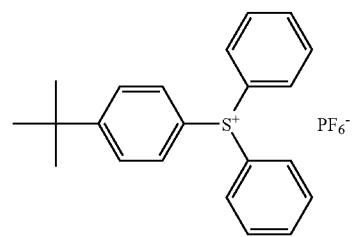
(b-15)
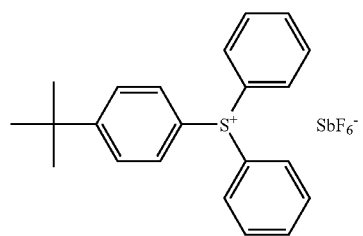
(b-16)
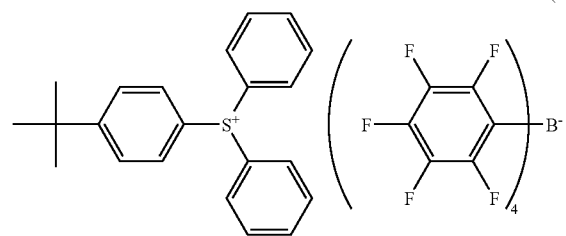
(b-17)
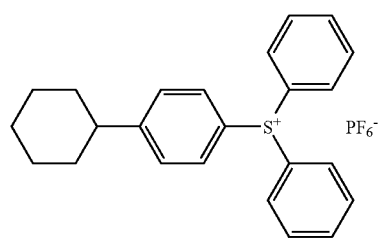
(b-18)
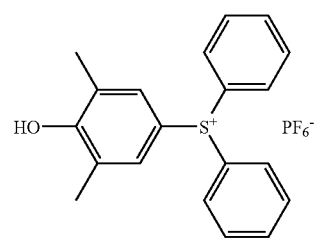
(b-19)
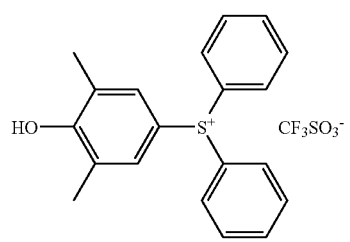
(b-20)
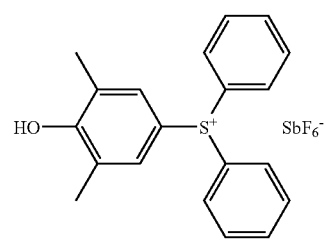
(b-21)
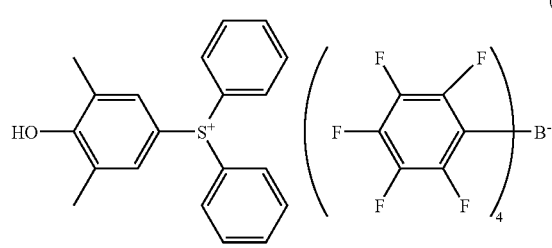
(b-22)
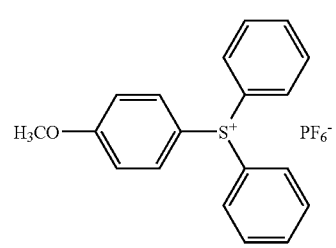
(b-23)
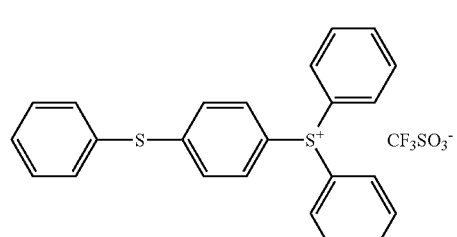
(b-24)
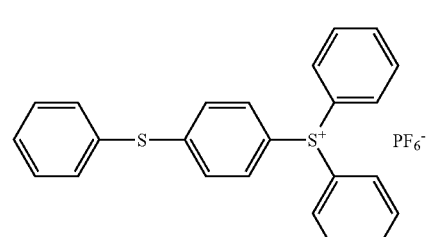

-continued
(b-25)
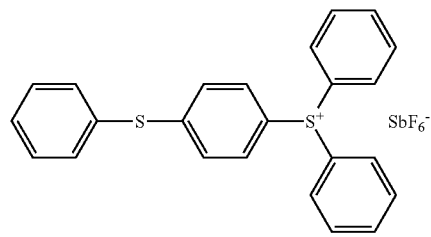
(b-26)
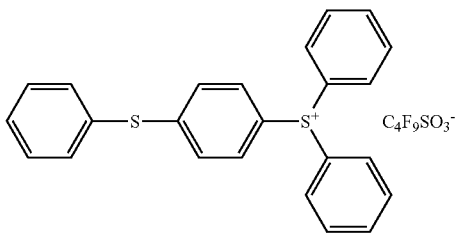
(b-27)
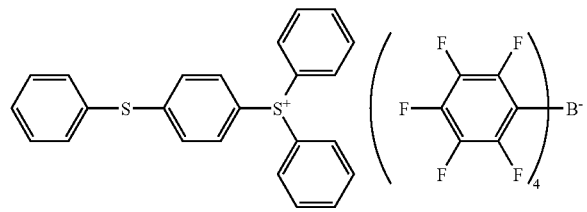
(b-28)
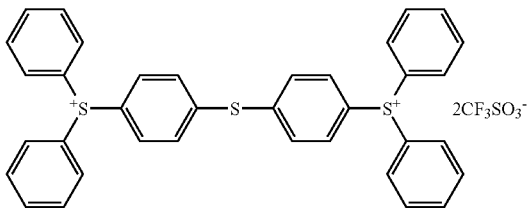
(b-29)
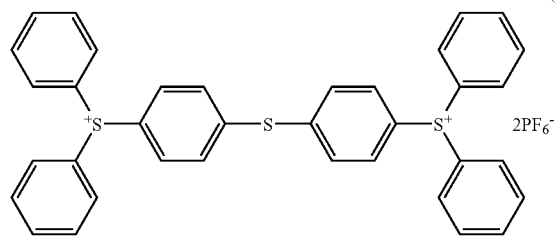
(b-30)
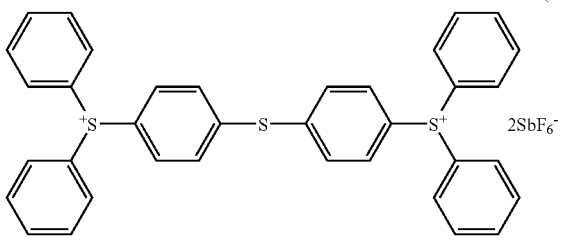
(b-31)
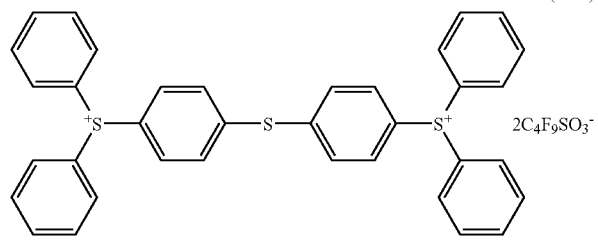
(b-32)
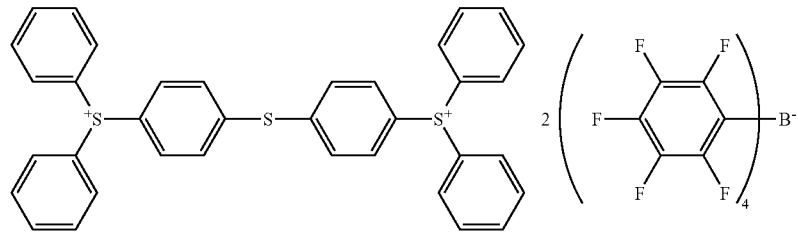
(b-33)    (b-34)
(b-35)    (b-36)
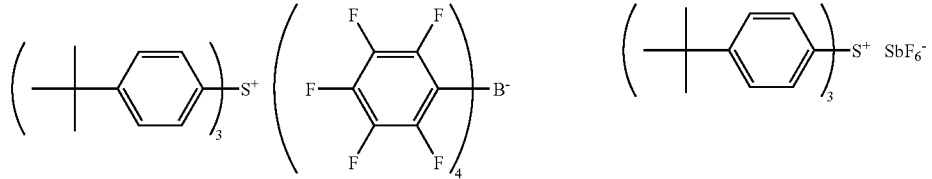

(b-37)
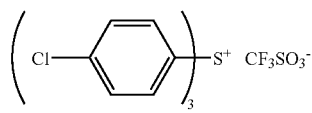
(b-39)
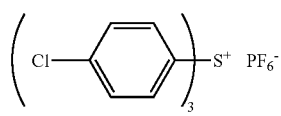
(b41)
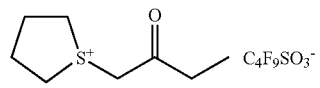
(b-43)
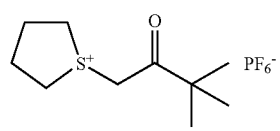
(b-45)
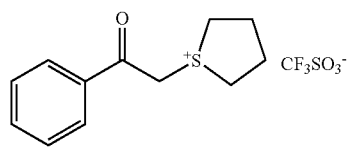
(b-47)
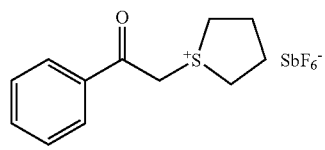
(b-49)
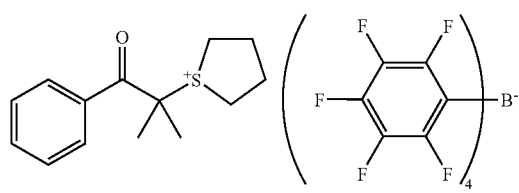
(b-51)
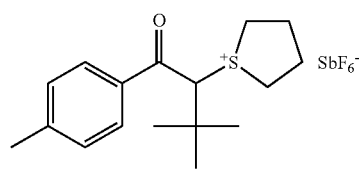
(b-53)
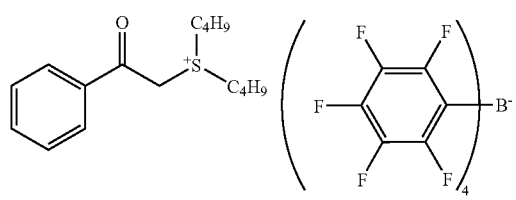
-continued
(b-38)
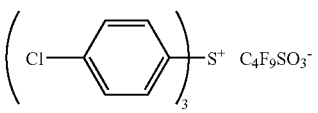
(b-40)
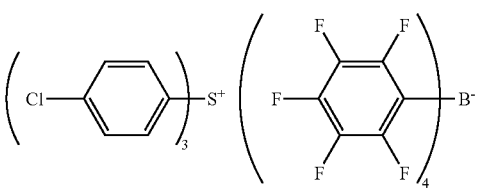
(b-42)
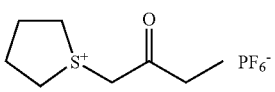
(b-44)
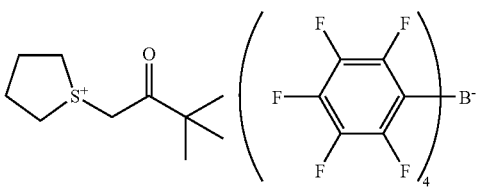
(b-46)
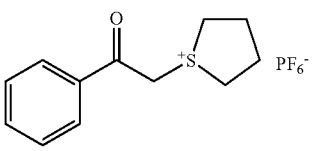
(b-48)
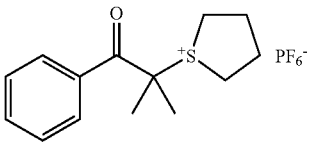
(b-50)
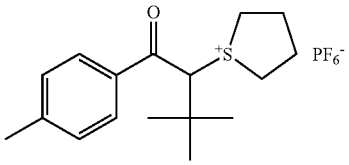
(b-52)
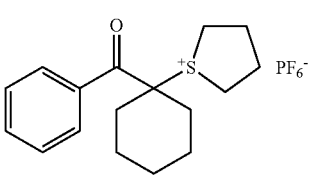
(b-54)
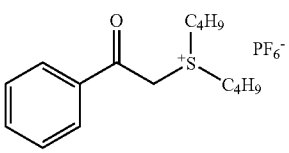

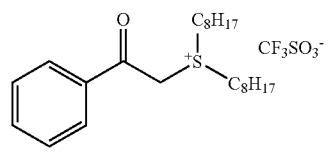 (b-55)
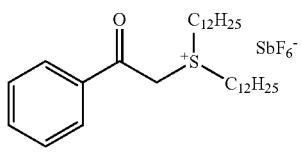 (b-56)
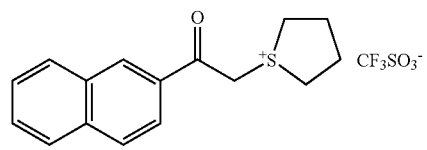 (b-57)
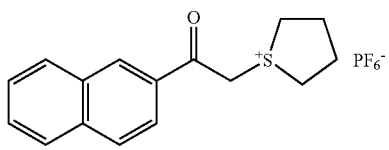 (b-58)
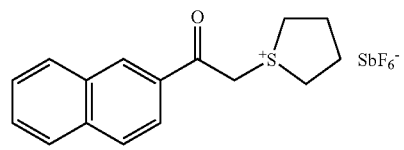 (b-59)
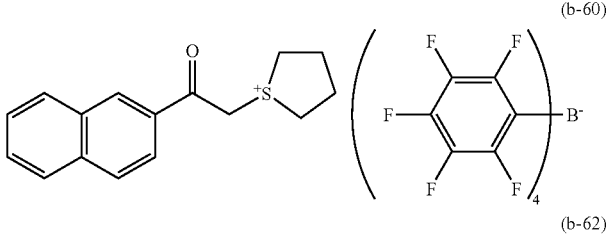 (b-60)
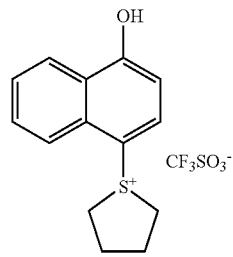 (b-61)
 (b-62)
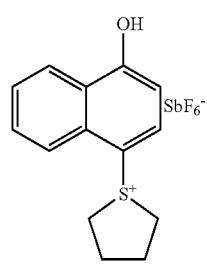 (b-63)
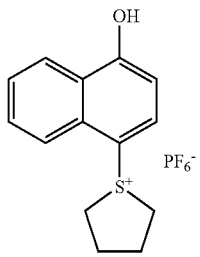 (b-64)
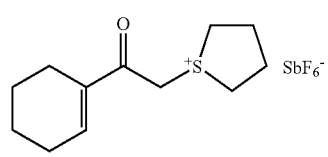 (b-65)
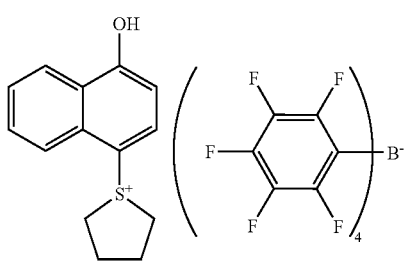 (b-66)
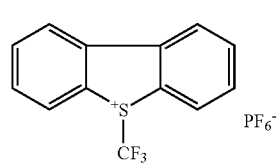 (b-67)
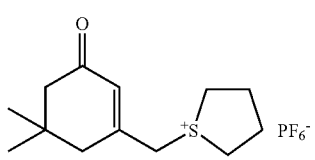 (b-68)
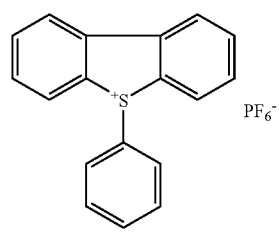 (b-69)
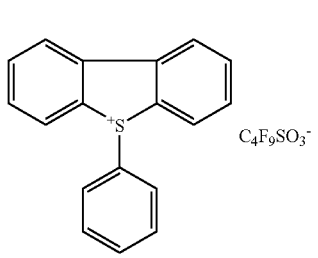 (b-70)

-continued
(b-71) 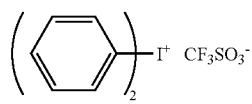
(b-72) 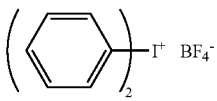
(b-73) 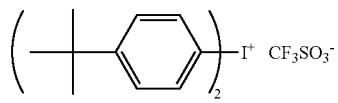
(b-74) 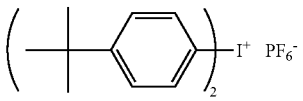
(b-75) 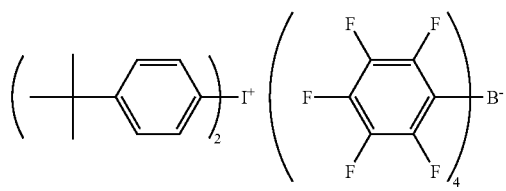
(b-76) 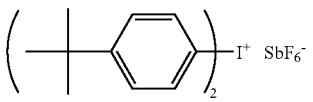
(b-77) 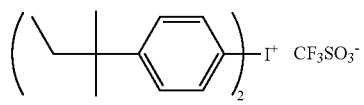
(b-78) 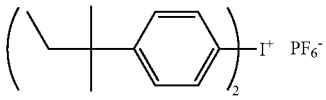
(b-79) 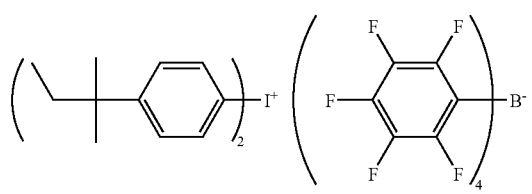
(b-80) 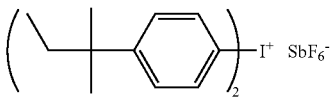
(b-81) 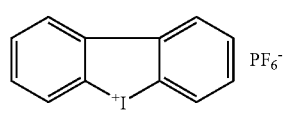
(b-82) 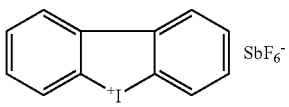
(b-83) 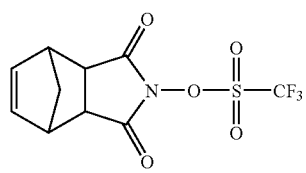
(b-84) 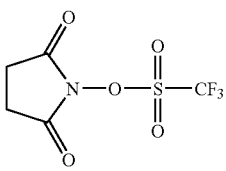
(b-85) 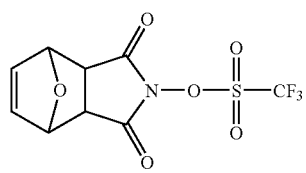
(b-86) 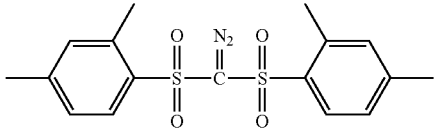
(b-87) 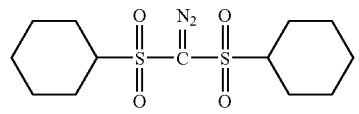
(b-88) 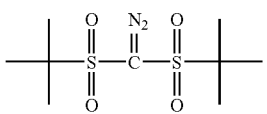
(b-89) 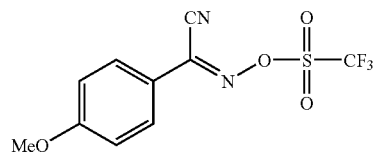

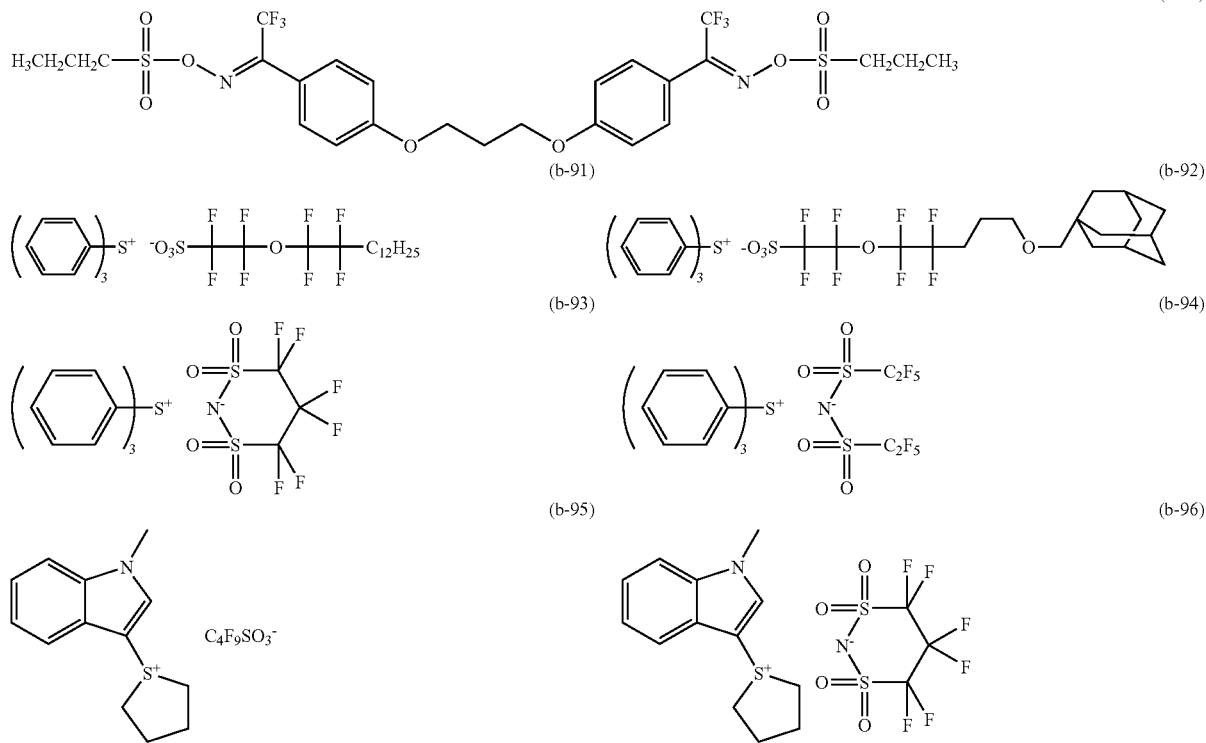

In the ink composition of the present invention, the total amount of polymerization initiator used is preferably 0.01 to 35 wt % relative to the total amount of polymerizable compound, including an N-vinyllactam, used, more preferably 0.5 to 20 wt %, and yet more preferably 1.0 to 15 wt %. The ink composition can be cured with 0.01 wt % or greater of the polymerization initiator, and a cured film having a uniform degree of curing can be obtained with 35 wt % or less.

Furthermore, when a sensitizer, which will be described later, is used in the ink composition of the present invention, the total amount of polymerization initiator used is preferably 200:1 to 1:200 relative to the sensitizer as a ratio by weight of polymerization initiator:sensitizer, more preferably 50:1 to 1:50, and yet more preferably 20:1 to 1:5.

(D) Basic Compound

The ink composition of the present invention comprises a basic compound. By containing the basic compound, an ink composition having excellent long-term storage stability can be obtained.

The basic compound used in the present invention is not particularly limited, and it is possible to use an inorganic basic compound or an organic basic compound, but it is preferable to use an organic basic compound.

It is preferable for the organic basic compound to have a higher basicity than phenol. The organic basic compound is preferably a nitrogen-containing organic basic compound, and more preferably an organic amine. In particular, it is preferable to use an organic amine compound containing a non-acid polar group such as a hydroxyl group, a cyano group, an ether bond, or an amide group. It is also preferable to use an organic amine having at least two amino groups per molecule. It is more preferable to use an organic amine compound having a polymerizable group. The use of an organic amine compound having a polymerizable group is particularly preferable since, when the ink composition is cured by irradiation with actinic radiation, the organic amine compound also cures and does not remain in the film.

Preferred specific examples of the basic compound in the present invention include decylamine, dodecylamine, N,N-dimethyldodecylamine, stearylamine, cetylamine, benzylpiperidine, N,N-dimethylcyclohexylamine, mono-, di-, or tri-ethanolamine, aminopropanol, aminobutanol, aminohexanol, dimethylaminohexanol, morpholine, aminoethylmorpholine, aminopropylmorpholine, aminoethylpiperazine, aminoethylpyrrolidine, bis(hydroxyethyl)piperazine, aminopropylpyrrolidinone, aminoethoxyethanol, dimethylaminoethylmorpholine, phenylmorpholine, 1,3-bis[1-(2-hydroxyethyl)-4-piperidyl]propane, gramine, 1-(2-phenethyl)-4-piperidone, ethylenediamine, trimethylenediamine, tetramethylenediamine, hexamethylenediamine, aniline, N,N-diethylaniline, dodecylaniline, aminobiphenyl, aminophenol, 4-aminoacetanilide, aminoacetophenone, aminobenzamide, aminobenzanilide, aminobenzophenone, aminopyridine, dimethylaminomethylthiophene, dimethylaminophenethyl alcohol, polyethyleneimine, polyarylamine, polyvinylpyridine, a copolymer of N,N-dimethylaminoethyl methacrylate and a methacrylic acid ester (e.g. butyl methacrylate), a copolymer of N,N-diethylaminoethyl methacrylate and an acrylic acid ester (e.g. ethyl acrylate), a copolymer of dimethylaminomethylstyrene and styrene, and a condensed polymer of 4-hydroxy-2,2,6,6-tetramethyl-1-piperidineethanol and 1,4-butanedioic acid.

It is also possible to use, as the amine having a polymerizable group, N,N-dimethylaminoethyl(meth)acrylate, N,N-diethylaminoethyl(meth)acrylate, and a so-called aminoacrylate in which a polyfunctional acrylate monomer or polyester acrylate is modified with an amine.

Amines having a polymerizable group are commercially available, and examples thereof include EBECRYL P115 and EBECRYL 7100 (Daicel-UCB Co., Ltd.), dimethylaminoethyl acrylate (DMA, Osaka Organic Chemical Industry Ltd.), dimethylaminoethyl methacrylate (Light-ester DM, Kyoeisha Chemical Co., Ltd.), and diethylaminoethyl methacrylate (Light-ester DE, Kyoeisha Chemical Co., Ltd.).

As nitrogen-containing basic compounds that can preferably be used as the basic compound, for example, the structures represented by (D-1) to (D-5) below can be cited.

(D-1)

Here, $R^{250}$, $R^{251}$, and $R^{252}$ independently denote a hydrogen atom, an alkyl group having 1 to 6 carbons, an aminoalkyl group having 1 to 6 carbons, a hydroxyalkyl group having 1 to 6 carbons, or a substituted or unsubstituted aryl group having 6 to 20 carbons, and $R^{251}$ and $R^{252}$ may be bonded to each other to form a ring.

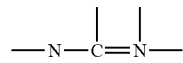
(D-2)

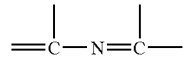
(D-3)

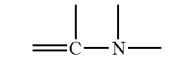
(D-4)

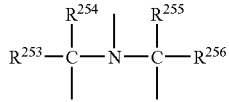
(D-5)

In the formulae, $R^{253}$, $R^{254}$, $R^{255}$, and $R^{256}$ independently denote an alkyl group having 1 to 6 carbons.

A more preferred compound is a nitrogen-containing basic compound having in one molecule at least two nitrogen atoms that are in different chemical environments, and a particularly preferred compound is a compound having both a substituted or unsubstituted amino group and a nitrogen-containing cyclic structure or a compound having an alkylamino group. Preferred specific examples thereof include a substituted or unsubstituted guanidine, a substituted or unsubstituted aminopyridine, a substituted or unsubstituted aminoalkylpyridine, a substituted or unsubstituted aminopyrrolidine, a substituted or unsubstituted indazole, a substituted or unsubstituted pyrazole, a substituted or unsubstituted pyrazine, a substituted or unsubstituted pyrimidine, a substituted or unsubstituted purine, a substituted or unsubstituted imidazoline, a substituted or unsubstituted pyrazoline, a substituted or unsubstituted piperazine, a substituted or unsubstituted aminomorpholine, and a substituted or unsubstituted aminoalkylmorpholine. Preferred substituents are an amino group, an aminoalkyl group, an alkylamino group, an aminoaryl group, an arylamino group, an alkyl group, an alkoxy group, an acyl group, an acyloxy group, an aryl group, an aryloxy group, a nitro group, a hydroxyl group, and a cyano group.

Preferred specific examples of the nitrogen-containing basic compound include guanidine, 1,1-dimethylguanidine, 1,1,3,3-tetramethylguanidine, 2-aminopyridine, 3-aminopyridine, 4-aminopyridine, 2-dimethylaminopyridine, 4-dimethylaminopyridine, 2-diethylaminopyridine, 2-(aminomethyl)pyridine, 2-amino-3-methylpyridine, 2-amino-4-methylpyridine, 2-amino-5-methylpyridine, 2-amino-6-methylpyridine, 3-aminoethylpyridine, 4-aminoethylpyridine, 3-aminopyrrolidine, piperazine, N-(2-aminoethyl)piperazine, N-(2-aminoethyl)piperidine, 4-amino-2,2,6,6-tetramethylpiperidine, 4-piperidinopiperidine, 2-iminopiperidine, 1-(2-aminoethyl)pyrrolidine, pyrazole, 3-amino-5-methylpyrazole, 5-amino-3-methyl-1-p-tolylpyrazole, pyrazine, 2-(aminomethyl)-5-methylpyrazine, pyrimidine, 2,4-diaminopyrimidine, 4,6-dihydroxypyrimidine, 2-pyrazoline, 3-pyrazoline, N-aminomorpholine, N-(2-aminoethyl)morpholine, 1,5-diazabicyclo[4.3.0]non-5-ene, 1,8-diazabicyclo[5.4.0]undec-7-ene, 1,4-diazabicyclo[2.2.2]octane, 2,4,5-triphenylimidazole, N-methylmorpholine, N-ethylmorpholine, N-hydroxyethylmorpholine, N-benzylmorpholine, and a tertiary morpholine derivative such as cyclohexylmorpholinoethylthiourea (CHMETU), but the examples are not limited thereto.

Furthermore, as an example of a nitrogen-containing basic compound that can be suitably used in the present invention, a hindered amine-based compound can be cited. The hindered amine-based compound can suitably be used since it also functions as a polymerization inhibitor.

The hindered amine-based compound is a compound having a moiety having a hindered amine structure in the molecule; examples thereof include those described in JP-A-61-91257, JP-A-11-52575 (e.g. those described in of the publication), and JP-A-2003-246138, and a representative compound thereof is a 2,2,6,6-tetramethylpiperidine derivative having a structure in which all the hydrogen atoms on the 2- and 6-carbons of the piperidine are replaced by methyl groups.

In the present invention, a hindered amine-based compound represented by Formula (II) below may preferably be used.

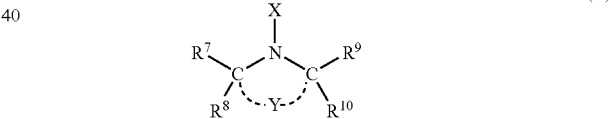
Formula (II)

In Formula (II), Y denotes a non-metallic atomic group necessary for forming a 5- to 7-membered ring together with C and N. X denotes a hydrogen atom, an aliphatic group, an aromatic group, an acyl group, an alkylsulfonyl group, an arylsulfonyl group, an alkylsulfinyl group, an arylsulfinyl group, a hydroxyl group, an aliphatic group-substituted oxy group, an aromatic group-substituted oxy group, an acyloxy group, an alkylsulfonyloxy group, an arylsulfonyloxy group, or an oxy radical group. $R^7$ to $R^{10}$ may be identical to or different from each other and each denotes a hydrogen atom or an alkyl group. Here, any two groups of $R^7$ to $R^{10}$ and Y may be bonded to each other to form a 5- to 7-membered ring.

In Formula (II), preferred examples of the 5- to 7-membered ring formed by Y include a pyrrolidine ring, a piperazine ring, a morpholine ring, and a piperidine ring.

In Formula (II), examples of the aliphatic group denoted by X include an alkyl group, an alkenyl group, an alkynyl group, and an aralkyl group, and they may further have a substituent. The aliphatic group may be an open-chain aliphatic group or a cyclic aliphatic group, and the open-chain aliphatic group may further be branched. Among them, an alkyl group and a substituted alkyl group are particularly preferable. Examples of the alkyl group include a methyl group, an ethyl group, an n-propyl group, an iso-propyl group, an n-butyl group, a t-butyl group, an n-octyl group, a benzyl group, and a hexadecyl group. Examples of the alkenyl group include an allyl group and an oleyl group, and examples of the alkynyl group include an ethynyl group. Examples of the aromatic group include an aryl group and a substituted aryl group, the aryl group preferably having 6 to 30 carbons, and more preferably 6 to 20 carbons. With regard to the number of carbons in the aryl moiety of the substituted aryl group, the above-mentioned range is also preferable. Specific examples of the aryl group include a phenyl group, an α-naphthyl group, and a β-naphthyl group. Examples of the acyl group include an acetyl group, a benzoyl group, and a pentanoyl group. The alkylsulfonyl group is preferably an alkylsulfonyl group having no greater than 30 carbons, and examples thereof include a methylsulfonyl group, a trifluoromethylsulfonyl group, an ethylsulfonyl group, a butylsulfonyl group, and a dodecylsulfonyl group. Examples of the arylsulfonyl group include a benzenesulfonyl group, a toluenesulfonyl group, and a naphthalenesulfonyl group. Examples of the alkylsulfinyl group include a methanesulfinyl group, and examples of the arylsulfinyl group include a benzenesulfinyl group. Examples of the aliphatic group-substituted oxy group include oxy groups substituted with an alkyl group, an alkenyl group, an alkynyl group, an aralkyl group, etc. Examples of the aromatic group-substituted oxy group include oxy groups substituted with an aryl group, a substituted aryl group, etc. Examples of the acyloxy group include an acetyloxy group and a benzoyloxy group.

$R^7$ to $R^{10}$ in Formula (II) denote a hydrogen atom or an alkyl group (this alkyl group is selected from the same range as for the alkyl group denoted by X above).

The compound represented by Formula (II) above may be synthesized easily in accordance with methods described in Journal of Synthetic Organic Chemistry, Japan, 29 (4), 366 (1971), JP-A-49-53571, JP-A-49-53572, JP-A-49-53573, JP-A-49-53574, JP-B-49-20974, EP-A-264,730, U.S. Pat. No. 4,639,415, etc.

Furthermore, in the present invention, a hindered amine-based compound represented by Formula (III) below in particular may be preferably used.

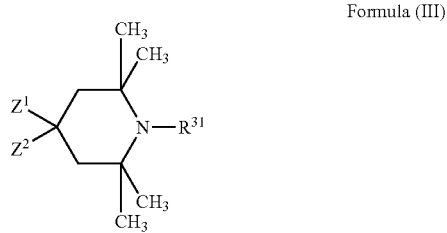

Formula (III)

In Formula (III), $R^{31}$ denotes a hydrogen atom, an aliphatic group, —$OR^{32}$ (said $R^{32}$ denotes a hydrogen atom, an aliphatic group, or an acyl group), —$O^-$, or an acyl group. $Z^1$ denotes a hydrogen atom, —$OR^{33}$ (said $R^{33}$ denotes a hydrogen atom, an aliphatic group, an aromatic group, an alkoxycarbonyl group, an acyl group, or an aminocarbonyl group), —$NR^{34}R^{35}$ (said $R^{34}$ and $R^{35}$ independently denote a hydrogen atom, an aliphatic group, an aromatic group, an acyl group, an aminocarbonyl group, or a sulfonyl group), —$COOR^{36}$ (said $R^{36}$ denotes a hydrogen atom, an aliphatic group, or an aromatic group), a halogen atom, an aliphatic group, or an aromatic group. $Z^2$ denotes a hydrogen atom, an aliphatic group, an aromatic group, or —$OR^{37}$ (said $R^{37}$ denotes a hydrogen atom or an aliphatic group). $Z^1$ and $Z^2$ may form a carbonyl group in a form containing the carbon atom substituted by $Z^1$ and $Z^2$, or may be bonded to each other to form a cyclic structure. At least one of $Z^1$ and $Z^2$ may denote a group that may form a bond as a result of a reaction with a reactive group contained in a polymer, an oligomer, or a low molecular weight compound.

When $R^{31}$ in Formula (III) denotes an aliphatic group, examples of this aliphatic group include an alkyl group, an alkenyl group, an alkynyl group, and an aralkyl group, and they may further have a substituent. Among them, an alkyl group, a substituted alkyl group, an alkenyl group, a substituted alkenyl group, an aralkyl group, and a substituted aralkyl group are preferable, and an alkyl group and a substituted alkyl group are particularly preferable. The aliphatic group may be an open-chain aliphatic group or a cyclic aliphatic group, and the open-chain aliphatic group may further be branched. Specific examples of $R^{31}$ above include a hydrogen atom, a methyl group, an ethyl group, a butyl group, an octyl group, a hydroxy group, a methoxy group, an ethoxy group, a butoxy group, an octyloxy group, an acetyloxy group, a pivaloyloxy group, a benzoyloxy group, —$O^-$, and an acetyl group. Among them, $R^{31}$ is more preferably a hydrogen atom.

Specific examples of $Z^1$ include a hydrogen atom, a hydroxy group, a methoxy group, an ethoxy group, a propyloxy group, an octyloxy group, a phenoxyethoxy group, a phenoxy group, an acetyloxy group, a propionyloxy group, a pivaloyloxy group, a benzoyloxy group, a thienyloxy group, a methoxycarbonyloxy group, a butylaminocarbonyloxy group, a phenylaminocarbonyloxy group, an amino group, an ethylamino group, a dibutylamino group, a dioctylamino group, a phenylamino group, a diphenylamino group, a hydroxyethylamino group, a bis(hydroxyethyl)amino group, a cyanoethylamino group, a carboxyethylamino group, a methoxycarbonyloxyethylamino group, a chloropropylamino group, a methylsulfonylamino group, a phenylsulfonylamino group, a butylaminocarbonylamino group, a carboxyl group, a methoxycarbonyl group, a hydroxyethyloxycarbonyl group, a chlorine atom, a fluorine atom, a bromine atom, an iodine atom, a methyl group, an ethyl group, an octadecyl group, a phenyl group, a tolyl group, an epoxy group, a chloroacetylamino group, and a chloroacetyloxy group. Specific examples of $Z^2$ include a hydrogen atom, a methyl group, an ethyl group, a butyl group, an octyl group, a phenyl group, a naphthyl group, a hydroxy group, a methoxy group, and an ethoxy group.

$Z^1$ and $Z^2$ may form a carbonyl group in a form containing the carbon atom substituted by $Z^1$ and $Z^2$, or may be bonded to each other to form a 5- to 7-membered ring. At least one of $Z^1$ and $Z^2$ may form a bond as a result of a reaction with a reactive group contained in a polymer, an oligomer, or a low molecular weight compound. In this case, the hindered amine compound means a compound having at least two hindered amine frameworks per molecule. In this case, at least one of $Z^1$ and $Z^2$ is a hydroxy group, an acyloxy group substituted with a halogen atom or a sulfonic acid ester group, an amino group, an acylamino group substituted with a halogen atom or a sulfonic acid ester group, a carboxyl group, a carbonyl group, etc., and these substituents and a polymer, an oligomer, or a low molecular weight compound having a reactive group that can undergo an addition reaction such as an SN1, SN2, etc. nucleophilic substitution reaction, a salt forming reaction, a Michael reaction, or a reaction with an epoxy compound can form a polymeric, oligomeric, or low molecular weight hindered amine compound having at least two hindered amine frameworks per molecule.

Specific examples of the hindered amine-based compound represented by Formula (II) or Formula (III) are listed below, but the present invention is not limited thereby.
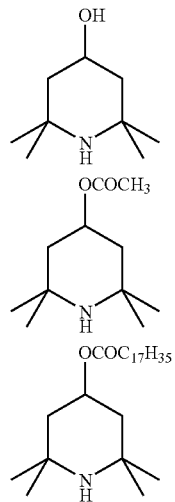
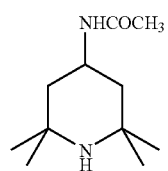
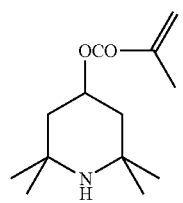
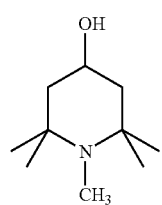
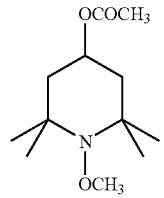
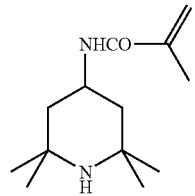
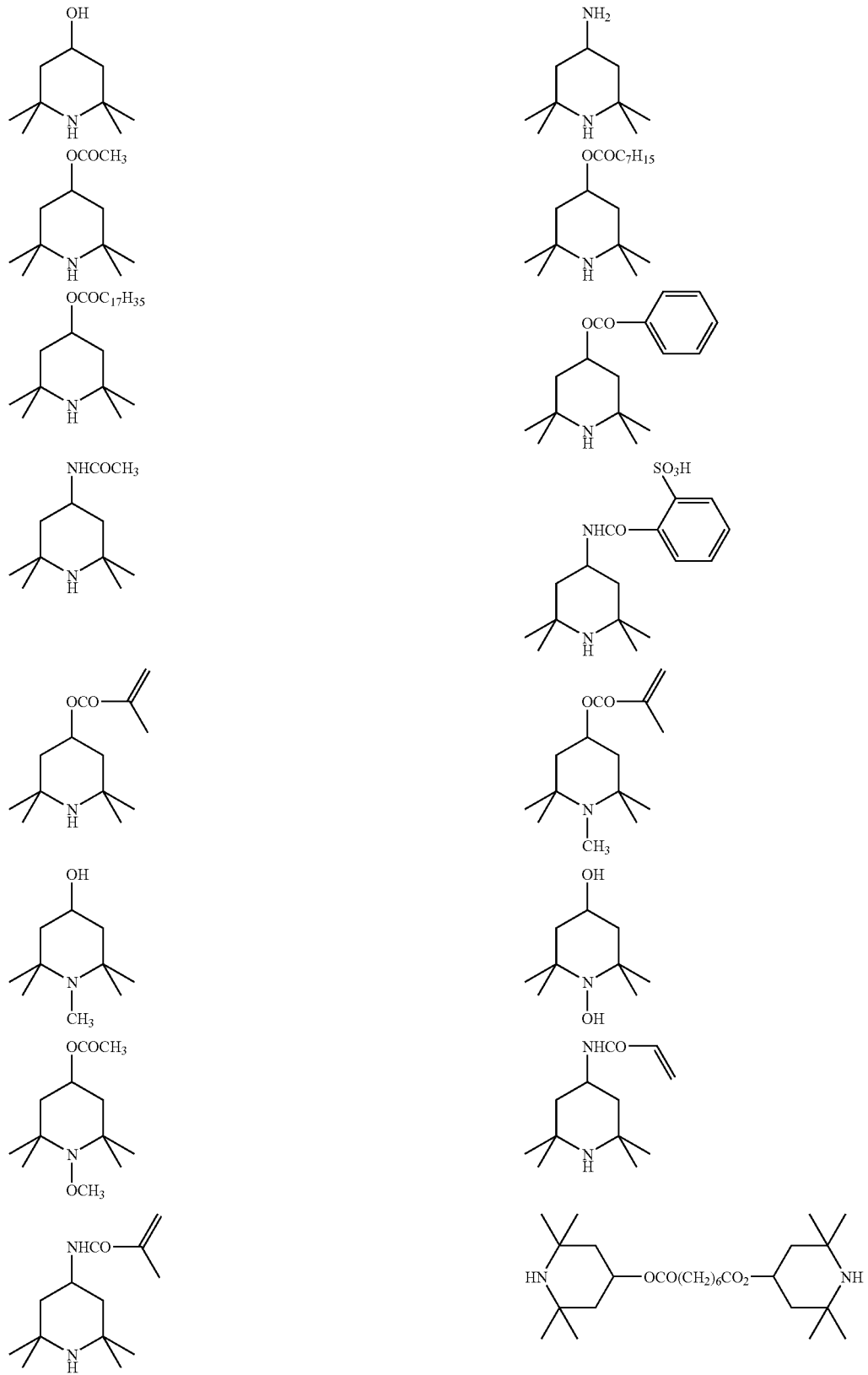

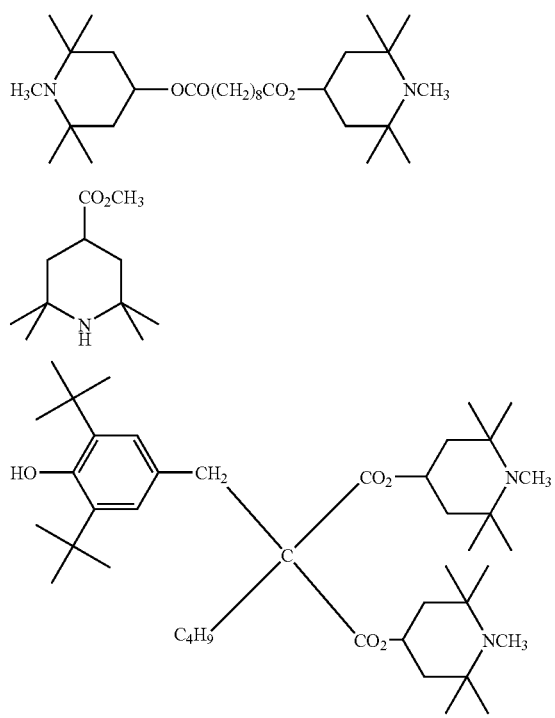
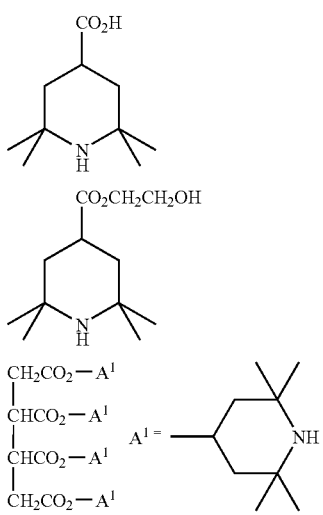
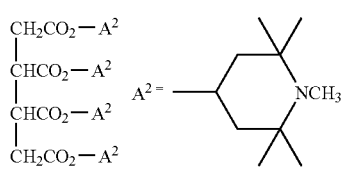
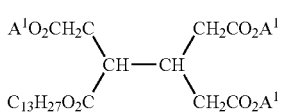
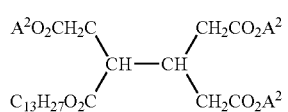
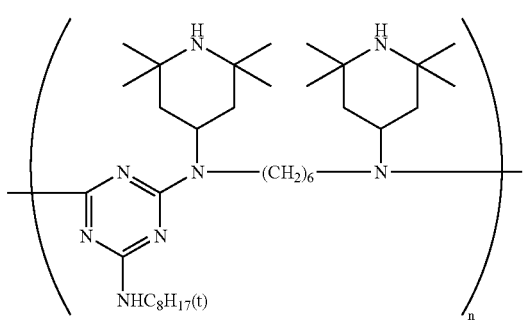
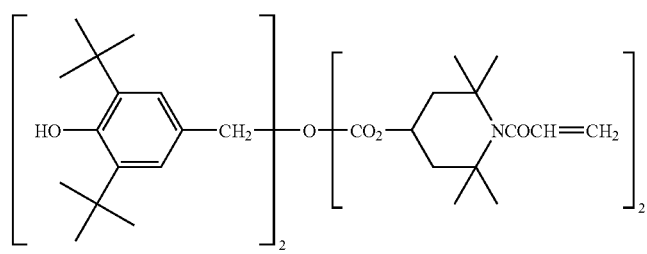
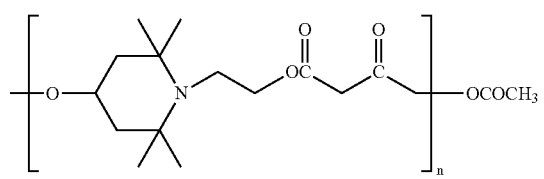
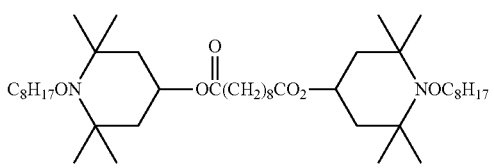

-continued
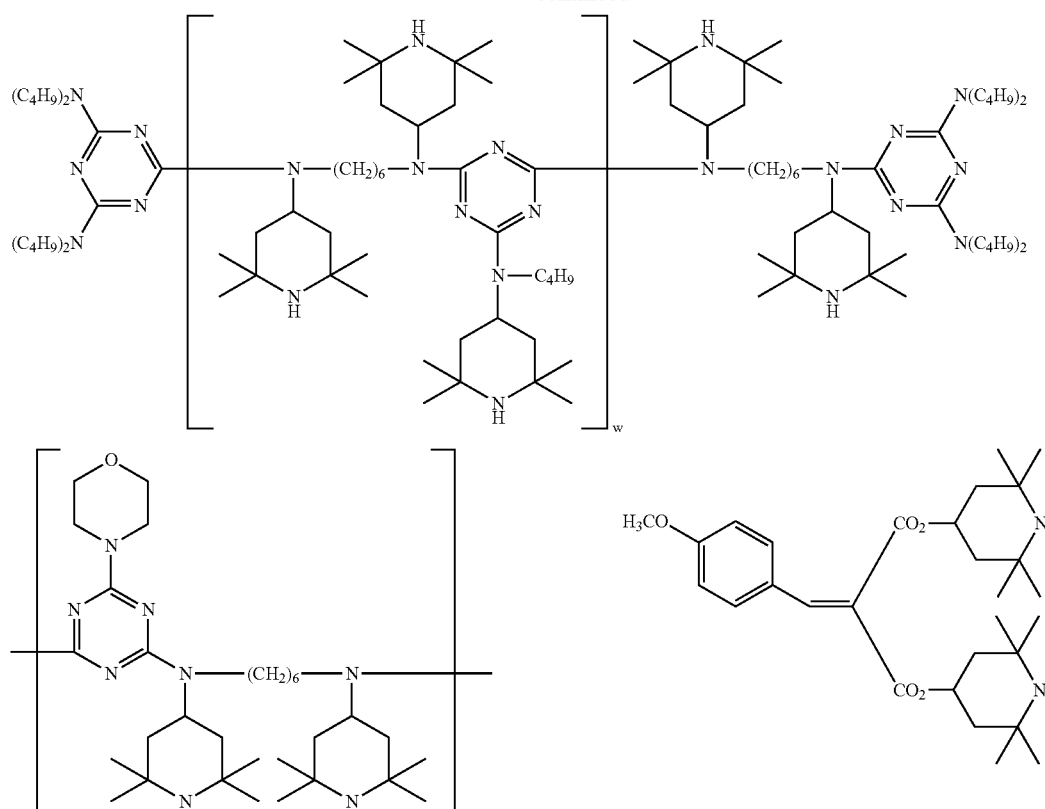
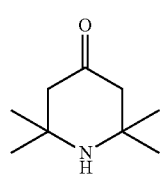
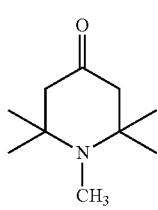
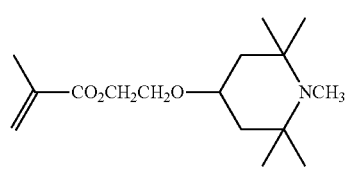
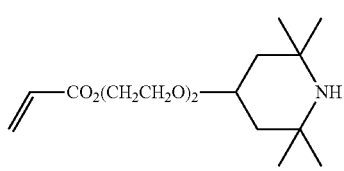
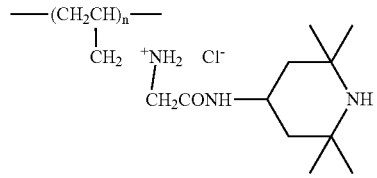
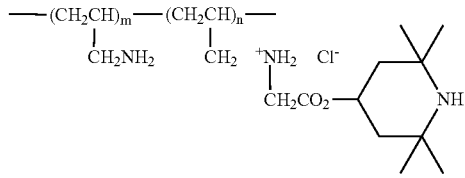
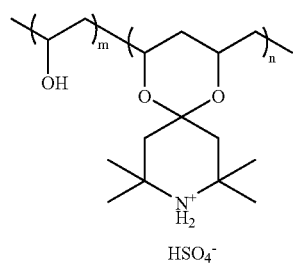

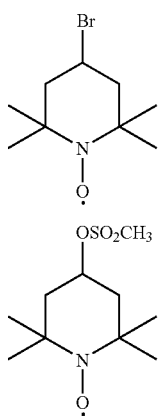
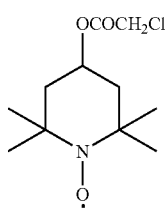
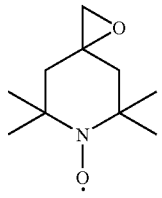
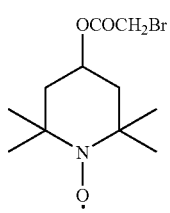
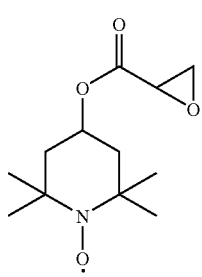
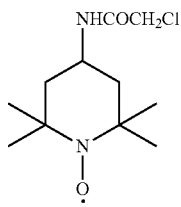
-continued
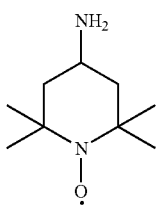
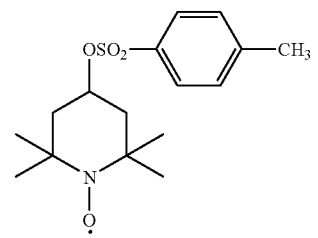
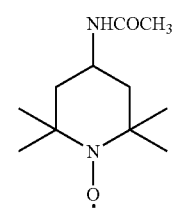
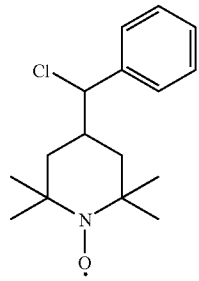
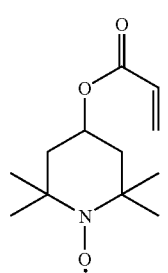
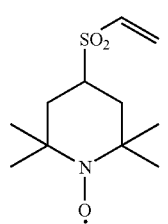
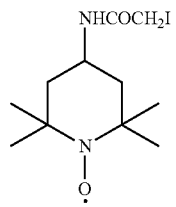

-continued
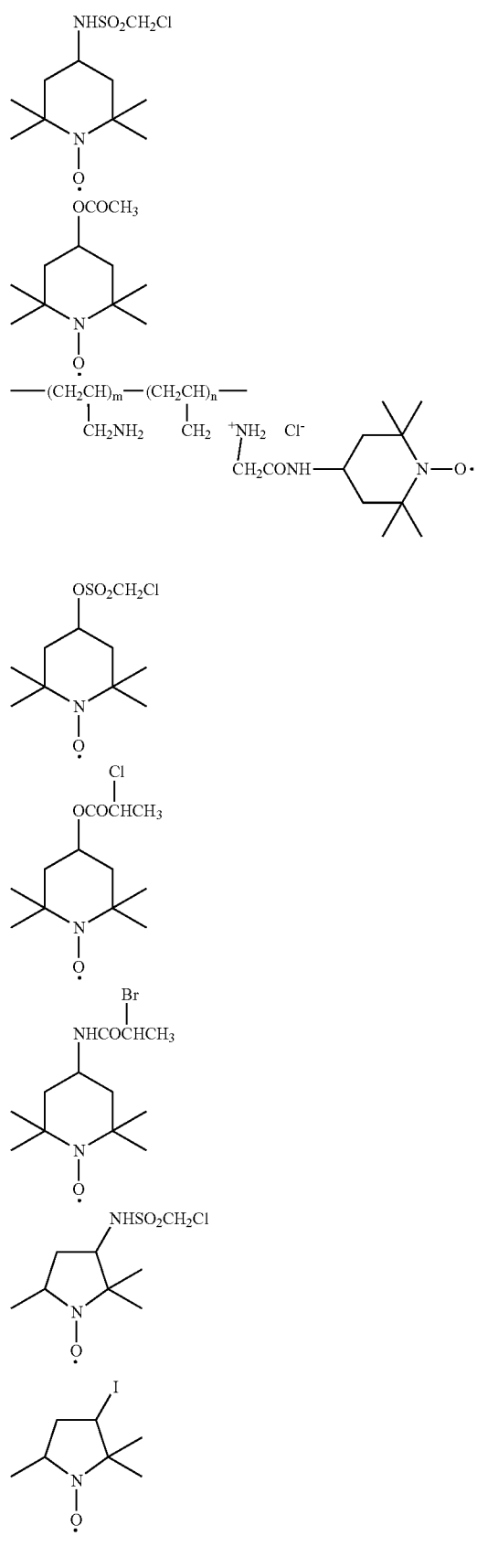
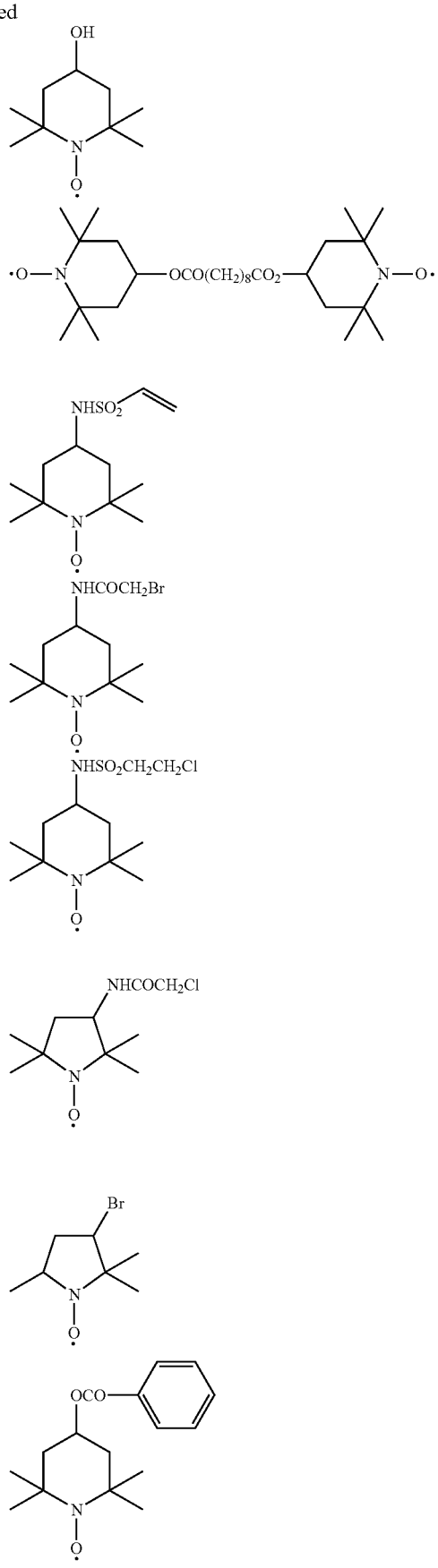

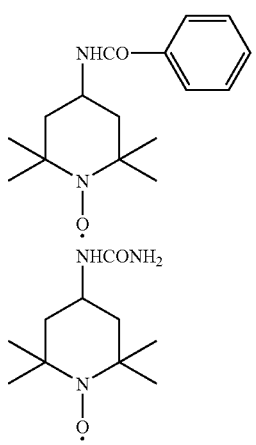

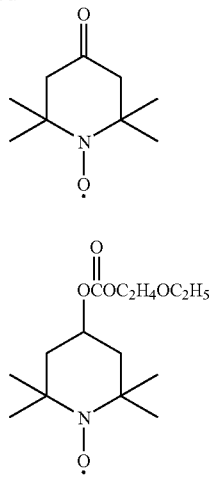

In the present invention, the basic compound may be used singly or in a combination of two or more types.

The content of the basic compound is preferably 0.001 to 10 wt % relative to the total weight of the ink composition, more preferably 0.005 to 8 wt %, and yet more preferably 0.01 to 5 wt %.

It is preferable for the content of the basic compound to be in the above-mentioned range since decomposition of the N-vinyllactam can be suppressed, thus improving the ink storage stability.

Furthermore, particularly when a hindered amine-based compound is used as the basic compound, the content of the hindered amine-based compound is preferably no greater than 5 wt % relative to the total weight of the ink composition. It is preferable for the amount of hindered amine-based compound added to be no greater than 5 wt % since there is little polymerization inhibition action and the sensitivity is not degraded.

(E) Radical Polymerization Inhibitor

It is preferable to add (E) a radical polymerization inhibitor to the ink composition of the present invention in order to prevent unnecessary polymerization of a polymerizable compound during production or storage of the ink composition or an image recording material to which the ink composition is applied.

Examples of the radical polymerization inhibitor suitably used in the present invention include phenols such as hydroquinone, hydroquinone monomethyl ether, mono-tert-butylhydroquinone, catechol, p-tert-butylcatechol, p-methoxyphenol, p-tert-butylcatechol, 2,6-di-tert-butyl-m-cresol, pyrogallol, β-naphthol, and 4-methoxy-1-naphthol, quinones such as benzoquinone, 2,5-diphenyl-p-benzoquinone, p-toluquinone, and p-xyloquinone; nitro compounds or nitroso compounds such as nitrobenzene, m-dinitrobenzene, 2-methyl-2-nitrosopropane, α-phenyl-tert-butylnitrone, 5,5-dimethyl-1-pyrroline 1-oxide, and tris(N-nitroso-N-phenylhydroxyamine) aluminum; amines such as amine-chloranil, diphenylamine, diphenylpicrylhydrazine, phenol-α-naphthylamine, pyridine, and phenothiazine; and sulfides such as dithiobenzoyl sulfide and dibenzyl tetrasulfide. Examples further include the above-mentioned hindered amine type compounds. They may be used singly or in a combination of a plurality thereof.

It is more preferable to use at least one compound selected from phenols, quinones, nitro compounds, nitroso compounds, amines, and sulfides. Among them, it is particularly preferable to use a nitroso compound.

The amount of radical polymerization inhibitor (E) contained in the ink composition of the present invention is preferably 0.0001 to 10 wt % relative to the total weight of the ink composition, more preferably 0.0005 to 5 wt %, and yet more preferably 0.001 to 3 wt %.

It is preferable for the amount of radical polymerization inhibitor added to be in the above-mentioned range since the ink storage stability can be improved and curing of the ink composition during exposure to radiation is not affected.

(F) Colorant

The ink composition of the present invention preferably comprises (F) a colorant.

The colorant that can be used in the present invention is not particularly limited; pigments and oil-soluble dyes having excellent weatherability and exhibiting good color reproduction are preferable, and selection can be made freely from known colorants such as soluble dyes. With regard to the colorant that can be used suitably in the ink composition or the inkjet recording ink composition of the present invention, from the viewpoint of not suppressing the sensitivity to a curing reaction by actinic radiation, a compound that does not function as a polymerization inhibitor in a polymerization reaction, which is a curing reaction, is preferably selected.

Pigment

A pigment that can be used in the present invention is not particularly limited and, for example, organic and inorganic pigments with the Color Index Nos. shown below may be used according to the intended purpose.

Red or magenta pigments: Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, and 257, Pigment Violet 3, 19, 23, 29, 30, 37, 50, and 88, and Pigment Orange 13, 16, 20, and 36.

Blue or cyan pigments: Pigment Blue 1, 15, 15:1, 15:2, 15:3, 15:4, 15:6, 16, 17-1, 22, 27, 28, 29, 36, and 60.

Green pigments: Pigment Green 7, 26, 36, and 50.

Yellow pigments: Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193.

Black pigments: Pigment Black 7, 28, and 26.

White pigment: Pigment White 6, 18, and 21.

Among them, in the present invention, a white pigment may preferably be used, and Pigment White 6 ($TiO_2$) may more preferably be used.

Specific examples of $TiO_2$ include KRONOS 1001, 1014, 1071, 1074, 1075, 1077, 1078, 1080, 1171, 2044, 2047, 2056, 2063, 2080, 2081, 2084, 2087, 2160, 2190, 2211, 2220, 2222, 2225, 2230, 2233, 2257, 2300, 2310, 2450, 2500, 3000, and 3025 manufactured by KRONOS, TITANIX JR-805 and JR-403, manufactured by Tayca Corporation, and Tipaque CR50-2, CR60, CR60-2, and CR63 manufactured by Ishihara Sangyo Kaisha Ltd.

Oil-Soluble Dye

The oil-soluble dye that can be used in the present invention is explained below.

The oil-soluble dye that can be used in the present invention means a dye that is substantially insoluble in water. Specifically, the solubility in water at 25° C. (the mass of dye that can be dissolved in 100 g of water) is no greater than 1 g, preferably no greater than 0.5 g, and more preferably no greater than 0.1 g. Therefore, the oil-soluble dye means a so-called water-insoluble pigment or an oil-soluble dye, and among these the oil-soluble dye is preferable.

Among the oil-soluble dyes that can be used in the present invention, as a yellow dye, any may be used. Examples thereof include aryl or heteryl azo dyes having a coupling component such as a phenol, a naphthol, an aniline, a pyrazolone, a pyridone, or an open-chain active methylene compound; azomethine dyes having a coupling component such as an open-chain active methylene compound; methine dyes such as benzylidene dyes and monomethineoxonol dyes; quinone dyes such as naphthoquinone dyes and anthraquinone dyes; and other dye species such as quinophthalone dyes, nitro/nitroso dyes, acridine dyes, and acridinone dyes.

Among the above-mentioned oil-soluble dyes that can be used in the present invention, as a magenta dye, any may be used. Examples thereof include aryl or heteryl azo dyes having a coupling component such as a phenol, a naphthol, or an aniline; azomethine dyes having a coupling component such as a pyrazolone or a pyrazolotriazole; methine dyes such as arylidene dyes, styryl dyes, merocyanine dyes, and oxonol dyes; carbonium dyes such as diphenylmethane dyes, triphenylmethane dyes, and xanthene dyes; quinone dyes such as naphthoquinones, anthraquinones, or anthrapyridones; and condensed polycyclic dyes such as dioxazine dyes.

Among the oil-soluble dyes that can be used in the present invention, as a cyan dye, any may be used. Examples thereof include indoaniline dyes, indophenol dyes, and azomethine dyes having a coupling component such as a pyrrolotriazole; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl or heteryl azo dyes having a coupling component such as a phenol, a naphthol, or an aniline; and indigo/thioindigo dyes.

The above-mentioned dyes may be dyes that exhibit respective colors of yellow, magenta, and cyan only after a part of the chromophore dissociates, and in that case the counter cation may be an inorganic cation such as an alkali metal or ammonium, may be an organic cation such as pyridinium or a quaternary ammonium salt, or may be a polymer cation having the above cation as a partial structure.

Although not limited to the following, preferred specific examples thereof include CI Solvent Black 3, 7, 27, 29, and 34; CI Solvent Yellow 14, 16, 19, 29, 30, 56, 82, 93, and 162; CI Solvent Red 1, 3, 8, 18, 24, 27, 43, 49, 51, 72, 73, 109, 122, 132, and 218; CI Solvent Violet 3; CI Solvent Blue 2, 11, 25, 35, 38, 67, and 70; CI Solvent Green 3 and 7; and CI Solvent Orange 2.

Particularly preferred examples thereof include Nubian Black PC-0850, Oil Black HBB, Oil Yellow 129, Oil Yellow 105, Oil Pink 312, Oil Red 5B, Oil Scarlet 308, Vali Fast Blue 2606, Oil Blue BOS (manufactured by Orient Chemical Industries, Ltd.), Aizen Spilon Blue GNH (manufactured by Hodogaya Chemical Co., Ltd.), Neopen Yellow 075, Neopen Magenta SE1378, Neopen Blue 808, Neopen Blue FF4012, and Neopen Cyan FF4238 (manufactured by BASF).

In the present invention, the oil-soluble dye may be used singly or in a combination of two or more types.

Furthermore, when the oil soluble dye is used as a colorant, another colorant such as a water-soluble dye, a disperse dye, or a pigment may be contained as necessary in a range that does not interfere with the effects of the present invention.

In the present invention, a disperse dye may be used in a range that enables it to be dissolved in a water-immiscible organic solvent. Disperse dyes generally include water-soluble dyes, but in the present invention it is preferable for the disperse dye to be used in a range such that it dissolves in a water-immiscible organic solvent. Specific preferred examples of the disperse dye include CI Disperse Yellow 5, 42, 54, 64, 79, 82, 83, 93, 99, 100, 119, 122, 124, 126, 160, 184:1, 186, 198, 199, 201, 204, 224, and 237; CI Disperse Orange 13, 29, 31:1, 33, 49, 54, 55, 66, 73, 118, 119, and 163; CI Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356, and 362; CI Disperse Violet 33; CI Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365, and 368; and CI Disperse Green 6:1 and 9.

Furthermore, in the present invention, it is preferable to use a pigment as the colorant, and for the base content on the surface thereof to be higher than the acid content.

The base content and the acid content on the surface of a pigment referred to here mean the amount of acid and the amount of base present respectively per kg of pigment; they are expressed in units of mmol/kg, but are usually given with the units omitted. The base content and the acid content on the surface of a pigment may be measured by a method described in 'Shikizai' (Coloring Materials), 1998, Vol. 61, No. 12, p. 692-698.

In the present invention, the 'pigment surface base content' may simply be called 'surface base content' or 'base content', and the 'pigment surface acid content' may simply be called 'surface acid content' or 'acid content'.

When the base content on the surface of the pigment is higher than the acid content, since interaction with a dispersant whose acid value is larger than its amine value becomes strong, the dispersion stability of the pigment during ink storage is excellent, which is preferable.

The base content on the surface of the pigment is preferably higher than the acid content by at least 1.0 mmol/kg, more preferably by at least 3.0 mmol/kg, and yet more preferably by at least 10 mmol/kg.

Since the higher the base content of the pigment the larger the number of sites that interact with an acid group of an acidic dispersant, the dispersion stability of the pigment is excellent. The base content on the surface of the pigment is preferably at least 5 mmol/kg, more preferably at least 10 mmol/kg, and particularly preferably at least 20 mmol/kg. Furthermore, it is preferably no greater than 200 mmol/kg, and more preferably no greater than 100 mmol/kg.

As a pigment that can be used in the present invention and that has a base content on the surface that is higher than the acid content, a white pigment can be cited as a preferred example, and titanium oxide is particularly preferable. Specifically, a titanium oxide whose base content is made higher than the acid content by treating the titanium oxide surface with alumina is preferable.

Such a titanium oxide is commercially available, and preferred examples thereof include KRONOS 2300 (acid content: 11, base content: 33), TITANIX JR-805 (acid content: 18, base content: 31), TITANIX JR-403 (acid content: 14, base content: 19), Tipaque CR50-2 (acid content: 16, base content: 24), Tipaque CR60 (acid content: 8, base content: 25), Tipaque CR60-2 (acid content: 8, base content: 25), and Tipaque CR63 (acid content: 8, base content: 9).

The colorant that can be used in the present invention is preferably added to the ink composition or the inkjet recording ink composition of the present invention and then dispersed in the ink to an appropriate degree. For dispersion of the colorant, for example, a dispersing machine such as a ball mill, a sand mill, an attritor, a roll mill, an agitator, a Henschel mixer, a colloidal mill, an ultrasonic homogenizer, a pearl mill, a wet type jet mill, or a paint shaker may be used.

The colorant may be added directly to the ink composition of the present invention, but in order to improve dispersibility it may be added in advance to a solvent or a dispersing medium such as a radically polymerizable compound used in the present invention.

In the present invention, in order to avoid the problem of the solvent resistance being degraded when the solvent remains in the cured image and the VOC (Volatile Organic Compound) problem of the residual solvent, it is preferable to add the colorant in advance to a dispersing medium such as a radically polymerizable compound. As a polymerizable compound used, it is preferable in terms of dispersion suitability to select a monomer having the lowest viscosity.

These colorants may be used by appropriately selecting one type or two or more types according to the intended purpose of the ink composition.

When a colorant such as a pigment that is present as a solid in the ink composition of the present invention is used, it is preferable for the colorant, the dispersant, the dispersing medium, dispersion conditions, and filtration conditions to be set so that the average particle size of colorant particles is preferably 0.005 to 0.5 μm, more preferably 0.01 to 0.45 μm, and yet more preferably 0.015 to 0.4 μm. By such control of particle size, clogging of a head nozzle can be suppressed, and the ink storage stability, the ink transparency, and the curing sensitivity can be maintained.

The content of the colorant in the ink composition of the present invention is appropriately selected according to the color and the intended purpose, and is generally preferably 0.01 to 30 wt % relative to the weight of the entire ink composition.

(G) Dispersant

In the present invention, (G) a dispersant is preferably added when dispersing the colorant (F). That is, the ink composition of the present invention preferably comprises the colorant (F) and the dispersant (G).

In the present invention, the dispersant (G) is preferably an acidic dispersant.

The acidic dispersant referred to here means a dispersant having an acidic functional group.

The acidic dispersant preferably has an acid value of at least 10 mg KOH/g, more preferably at least 20 mg KOH/g, and yet more preferably at least 40 mg KOH/g. Furthermore, it is preferable for the acidic dispersant to have an acid value that is larger than its amine value.

The amine value referred to here means the total amount of primary, secondary, and tertiary amines, and is expressed as the number of mg of KOH equivalent to the hydrochloric acid necessary for neutralizing 1 g of a sample. The acid value referred to here is expressed as the number of mg of KOH necessary for neutralizing a free fatty acid, a resin acid, etc. contained in 1 g of a sample.

The dispersant is not particularly limited as long as it is an acidic dispersant, but it is preferable to use a polymeric dispersant, and it is more preferable to use a polymeric dispersant whose acid value is larger than its amine value.

In the present invention, the difference between the acid value and the amine value of the dispersant is preferably at least 5 mg KOH/g, more preferably at least 10 mg KOH/g, and yet more preferably at least 20 mg KOH/g.

Specific examples of the dispersant having an acid value that is larger than its amine value include polymeric dispersants such as Disper BYK-101 (acid value: 30 mg KOH/g, amine value: 0 mg KOH/g), Disper BYK-102 (acid value: 101 mg KOH/g, amine value: 0 mg KOH/g), Disper BYK-103 (acid value: 101 mg KOH/g, amine value: 0 mg KOH/g), Disper BYK-106 (acid value: 132 mg KOH/g, amine value: 74 mg KOH/g), and Disper BYK-111 (acid value: 129 mg KOH/g, amine value: 0 mg KOH/g) (all manufactured by BYK Chemie) and EFKA 4010 (acid value: 10 to 15 mg KOH/g, amine value: 4 to 8 mg KOH/g) (manufactured by EFKA Additives); and various types of Solsperse dispersants such as Solsperse 36000 (acid value: 45 mg KOH/g, amine value: 0 mg KOH/g), Solsperse 41000 (acid value: 50 mg KOH/g, amine value: 0 mg KOH/g), Solsperse 3000 (acid value: 3,000 mg KOH/g, amine value: 0 mg KOH/g), Solsperse 21000 (acid value: 72 mg KOH/g, amine value: 0 mg KOH/g), Solsperse 26000 (acid value: 50 mg KOH/g, amine value: 0 mg KOH/g), Solsperse 36600 (acid value: 23 mg KOH/g, amine value: 0 mg KOH/g), Solsperse 39000 (acid value: 33 mg KOH/g, amine value: 0 mg KOH/g), Solsperse 41090 (acid value: 23 mg KOH/g, amine value: 0 mg KOH/g), Solsperse 43000 (acid value: 8 mg KOH/g, amine value: 0 mg KOH/g), Solsperse 44000 (acid value: 12 mg KOH/g, amine value: 0 mg KOH/g), Solsperse 53095 (acid value: 47 mg KOH/g, amine value: 0 mg KOH/g), and Solsperse 54000 (acid value: 47 mg KOH/g, amine value: 0 mg KOH/g) (all manufactured by Zeneca).

In the present invention, the dispersant (G) may be used singly or in a combination of a plurality of types.

It is also possible to use another known dispersant in combination. Specific examples thereof include Disper BYK-161 (amine value 11 mg KOH/g, acid value 0 mg KOH/g), Disper BYK-162 (amine value 13 mg KOH/g, acid value 0 mg KOH/g), Disper BYK-163 (amine value 10 mg KOH/g, acid value 0 mg KOH/g), Disper BYK-164 (amine value 18 mg KOH/g, acid value 0 mg KOH/g), Disper BYK-166 (amine value 20 mg KOH/g, acid value 0 mg KOH/g), Disper BYK-167 (amine value 13 mg KOH/g, acid value 0 mg KOH/g), Disper BYK-168 (amine value 10 mg KOH/g, acid value 0 mg KOH/g), and Disper BYK-182 (amine value 13 mg KOH/g, acid value 0 mg KOH/g) (all manufactured by BYK Chemie), EFKA 4046 (amine value 17 to 21 mg KOH/g, acid value 0 mg KOH/g), EFKA 4060 (amine value 6 to 10 mg KOH/g, acid value 0 mg KOH/g), EFKA 4080 (amine value 3.6 to 4.1 mg KOH/g, acid value 0 mg KOH/g), EFKA 4800 (amine value 37 to 43 mg KOH/g, acid value 0 mg KOH/g), and EFKA 7462 (amine value 8 mg KOH/g, acid value 0 mg KOH/g) (all manufactured by EFKA Additives), various types of Solsperse dispersants such as Solsperse 13240 (basic dispersant), Solsperse 13940 (basic dispersant), Solsperse 24000 (amine value 47 mg KOH/g, acid value 24 mg KOH/g), Solsperse 28000 (basic dispersant), and Solsperse 32000 (amine value 180 mg KOH/g, acid value 15 mg KOH/g) (all manufactured by Zeneca), and Disparlon DA-234 (amine value 20 mg KOH/g, acid value 16 mg KOH/g) and Disparlon DA-325 (amine value 20 mg KOH/g, acid value 14 mg KOH/g) (both manufactured by Kusumoto Chemicals, Ltd.).

The content of the dispersant in the ink composition of the present invention is appropriately selected according to the intended purpose, and is preferably 0.01 to 50 wt % relative to the weight of the pigment, more preferably 0.1 to 30 wt %, and yet more preferably 1 to 10 wt %.

It is preferable for the amount of dispersant added to be equal to or greater than 0.01 wt % since the dispersibility of the pigment is excellent and the dispersion stability is good. It is preferable for the amount of dispersant added to be no greater than 50 wt % since the ink stability over time is good.

(H) Surfactant

It is preferable to add a surfactant to the ink composition of the present invention in order to impart long-term discharge stability.

As the surfactant, those described in JP-A-62-173463 and 62-183457 can be cited. Examples thereof include anionic surfactants such as dialkylsulfosuccinic acid salts, alkylnaphthalene sulfonic acid salts, and fatty acid salts, nonionic surfactants such as polyoxyethylene alkyl ethers, polyoxyethylene alkyl aryl ethers, acetylene glycols, and polyoxyethylene/polyoxypropylene block copolymers, and cationic surfactants such as alkylamine salts and quaternary ammonium salts. An organofluoro compound may be used instead of the above-mentioned surfactant. The organofluoro compound is preferably hydrophobic. Examples of the organofluoro compound include fluorine-based surfactants, oil-like fluorine-based compounds (e.g. fluorine oil), solid fluorine compound resins (e.g. tetrafluoroethylene resin), and those described in JP-B-57-9053 (paragraphs 8 to 17) and JP-A-62-135826.

The content of the surfactant in the ink composition of the present invention is appropriately selected according to the intended purpose and is generally preferably 0.0001 to 1 wt % relative to the weight of the entire ink composition.

Other Component

The ink composition of the present invention may comprise another component as necessary. Examples of the other component include a sensitizer, a cosensitizer, a UV absorber, an antioxidant, an antifading agent, a conductive salt, a solvent, and a polymer compound.

Sensitizer

The ink composition of the present invention may contain a sensitizer in order to promote decomposition of the above-mentioned polymerization initiator by absorbing specific actinic radiation, in particular when used for inkjet recording. The sensitizer absorbs specific actinic radiation and attains an electronically excited state. The sensitizer in the electronically excited state causes actions such as electron transfer, energy transfer, or heat generation upon contact with the polymerization initiator. This causes the polymerization initiator to undergo a chemical change and decompose, thus forming a radical, an acid, or a base.

As a sensitizer in the ink composition of the present invention, a known sensitizer may be appropriately used, and it is preferable to use a sensitizing dye.

Preferred examples of the sensitizing dye include those that belong to compounds below and have an adsorption wavelength in the region of 350 nm to 450 nm.

Polynuclear aromatic compounds (e.g. pyrene, perylene, triphenylene), xanthenes (e.g. fluorescein, eosin, erythrosine, rhodamine B, rose bengal), cyanines (e.g. thiacarbocyanine, oxacarbocyanine), merocyanines (e.g. merocyanine, carbomerocyanine), thiazines (e.g. thionine, methylene blue, toluidine blue), acridines (e.g. acridine orange, chloroflavin, acriflavine), anthraquinones (e.g. anthraquinone), squaryliums (e.g. squarylium), and coumarins (e.g. 7-diethylamino-4-methylcoumarin).

Preferred examples of the sensitizing dye include compounds represented by Formulae (IX) to (XIII) below.

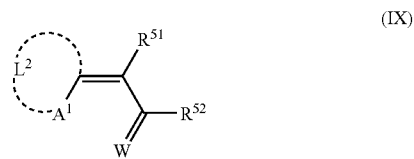

(IX)

In Formula (IX), $A^1$ denotes a sulfur atom or $NR^{50}$, $R^{50}$ denotes an alkyl group or an aryl group, $L^2$ denotes a non-metallic atomic group forming a basic nucleus of a dye in cooperation with a neighboring $A^1$ and the neighboring carbon atom, $R^{51}$ and $R^{52}$ independently denote a hydrogen atom or a monovalent non-metallic atomic group, and $R^{51}$ and $R^{52}$ may be bonded together to form an acidic nucleus of a dye. W denotes an oxygen atom or a sulfur atom.

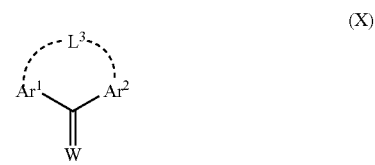

(X)

In Formula (X), $Ar^1$ and $Ar^2$ independently denote an aryl group and are connected to each other via a bond of $-L^3-$. Here, $L^3$ denotes —O— or —S—. W has the same meaning as that shown in Formula (IX).

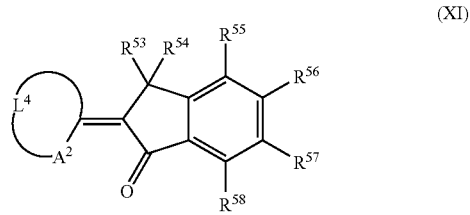

(XI)

In Formula (XI), $A_2$ denotes a sulfur atom or $NR^{59}$, $L^4$ denotes a non-metallic atomic group forming a basic nucleus of a dye in cooperation with the neighboring $A_2$ and carbon atom, $R^{53}$, $R^{54}$, $R^{55}$, $R^{56}$, $R^{57}$, and $R^{58}$ independently denote a monovalent non-metallic atomic group, and $R^{59}$ denotes an alkyl group or an aryl group.

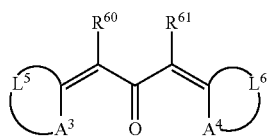
(XII)

In Formula (XII), $A^3$ and $A^4$ independently denote —S—, —$NR^{62}$—, or —$NR^{63}$—, $R^{62}$ and $R^{63}$ independently denote a substituted or unsubstituted alkyl group, or a substituted or unsubstituted aryl group, $L^5$ and $L^6$ independently denote a non-metallic atomic group forming a basic nucleus of a dye in cooperation with the neighboring $A^3$ and $A^4$ and neighboring carbon atom, and $R^{60}$ and $R^{61}$ independently denote a hydrogen atom or a monovalent non-metallic atomic group, or are bonded to each other to form an aliphatic or aromatic ring.

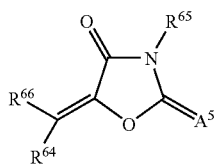
(XIII)

In Formula (XIII), $R^{66}$ denotes an aromatic ring or a hetero ring, which may have a substituent, and $A^5$ denotes an oxygen atom, a sulfur atom, or —$NR^{67}$—. $R^{64}$, $R^{65}$, and $R^{67}$ independently denote a hydrogen atom or a monovalent non-metallic atomic group, and $R^{67}$ and $R^{64}$, and $R^{65}$ and $R^{67}$ may be bonded to each other to form an aliphatic or aromatic ring.

Specific examples of the compounds represented by Formulae (IX) to (XIII) include (E-1) to (E-20) listed below.

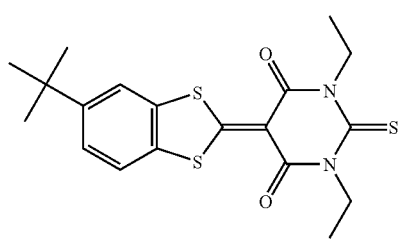
(E-1)

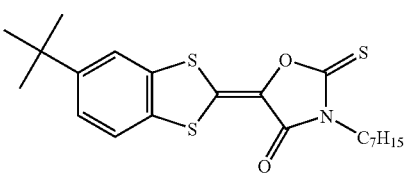
(E-2)

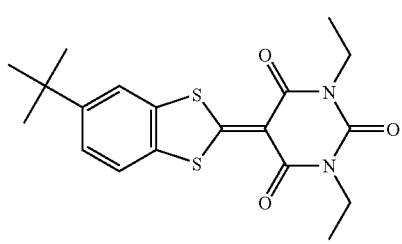
(E-3)

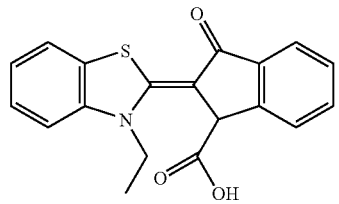
(E-4)

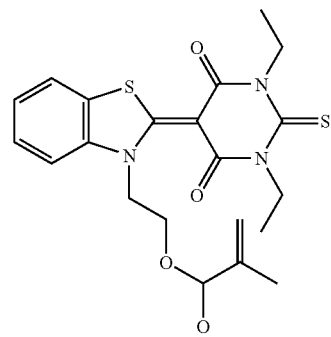
(E-5)

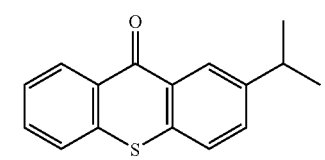
(E-6)

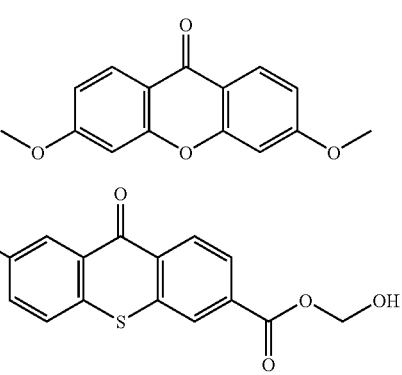
(E-7)

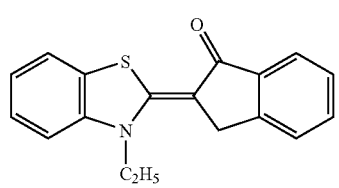
(E-8)

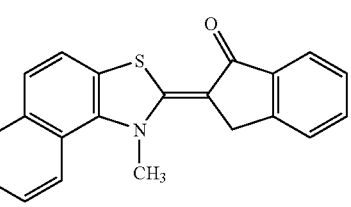
(E-9)

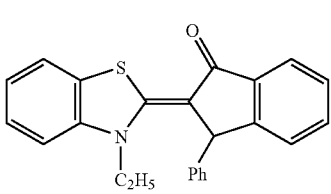
(E-10)

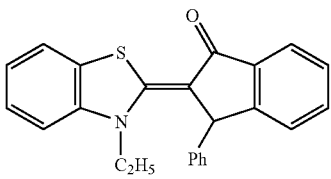
(E-11)

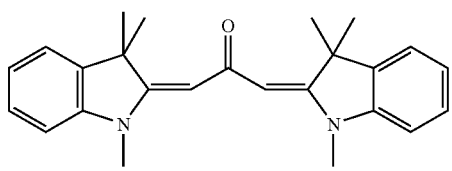
(E-12)

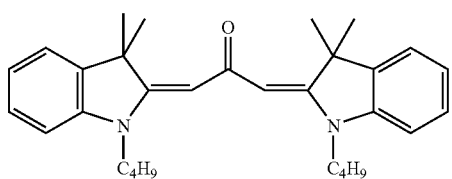
(E-13)

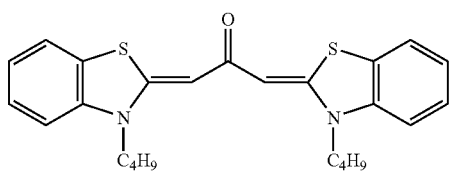
(E-14)

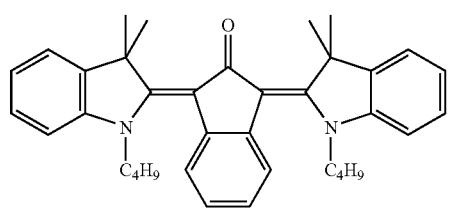
(E-15)

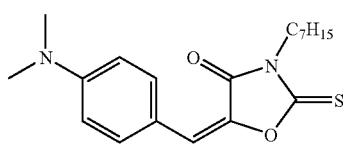
(E-16)

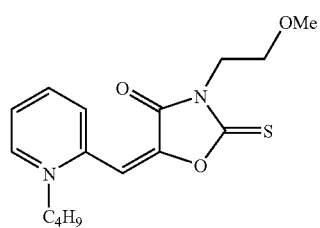
(E-17)

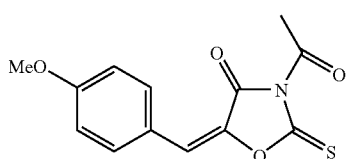
(E-18)

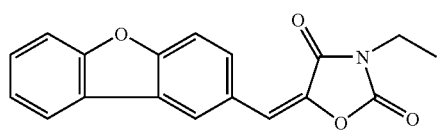
(E-19)

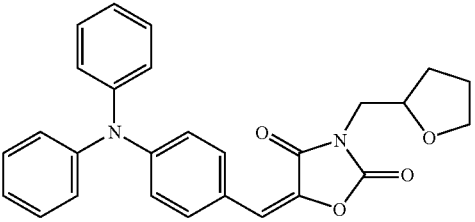
(E-20)

The content of the sensitizing colorant in the ink composition of the present invention is appropriately selected according to the intended purpose, but it is generally preferably 0.05 to 4 wt % relative to the weight of the entire ink composition.

Cosensitizer

The ink composition of the present invention preferably comprises a cosensitizer. In the present invention, the cosensitizer has the function of further improving the sensitivity of the sensitizing dye to actinic radiation or the function of suppressing inhibition by oxygen of polymerization of a polymerizable compound, etc.

Examples of such a cosensitizer include amines such as compounds described in M. R. Sander et al., 'Journal of Polymer Society', Vol. 10, p. 3173 (1972), JP-B-44-20189, JP-A-51-82102, JP-A-52-134692, JP-A-59-138205, JP-A-60-84305, JP-A-62-18537, JP-A-64-33104, and Research Disclosure No. 33825, and specific examples thereof include triethanolamine, ethyl p-dimethylaminobenzoate, p-formyldimethylaniline, and p-methylthiodimethylaniline.

Other examples of the cosensitizer include thiols and sulfides such as thiol compounds described in JP-A-53-702, JP-B-55-500806, and JP-A-5-142772, and disulfide compounds of JP-A-56-75643, and specific examples thereof include 2-mercaptobenzothiazole, 2-mercaptobenzoxazole, 2-mercaptobenzimidazole, 2-mercapto-4(3H)-quinazoline, and p-mercaptonaphthalene.

Yet other examples of the cosensitizer include amino acid compounds (e.g. N-phenylglycine, etc.), organometallic compounds described in JP-B-48-42965 (e.g. tributyltin acetate, etc.), hydrogen-donating compounds described in JP-B-55-34414, sulfur compounds described in JP-A-6-308727 (e.g. trithiane, etc.), phosphorus compounds described in JP-A-6-250387 (diethylphosphite, etc.), and Si—H, Ge—H compounds described in JP-A-8-54735.

The content of the cosensitizer in the ink composition of the present invention is appropriately selected according to the intended purpose, but it is generally preferably 0.05 to 4 wt % relative to the weight of the entire ink composition.

UV Absorber

A UV absorber may be used from the viewpoint of improving the weather resistance of an image obtained and preventing discoloration.

The UV absorbers include benzotriazole compounds described in JP-A-58-185677, JP-A-61-190537, JP-A-2-782, JP-A-5-197075 and JP-A-9-34057; benzophenone compounds described in JP-A-46-2784, JP-A-5-194483 and U.S. Pat. No. 3,214,463; cinnamic acid compounds described in JP-B-48-30492, JP-B-56-21141 and JP-A-10-88106; triazine compounds described in JP-A-4-298503, JP-A-8-53427, JP-A-8-239368, JP-A-10-182621 and JP-W-8-501291 (the term "JP-W" as used herein means an unexamined published international patent application); compounds described in Research Disclosure No. 24239; and compounds represented by stilbene and benzoxazole compounds, which absorb ultraviolet rays to emit fluorescence, the so-called fluorescent brightening agents.

The amount thereof added is appropriately selected according to the intended application, and it is generally on the order of 0.5 to 15 wt % on the basis of the solids content in the ink composition.

Antioxidant

In order to improve the stability of the ink composition, an antioxidant may be added. Examples of the antioxidant include those described in Laid-open European Patent Nos. 223739, 309401, 309402, 310551, 310552, and 459-416, Laid-open German Patent No. 3435443, JP-A-54-48535, JP-A-62-262047, JP-A-63-113536, JP-A-63-163351, JP-A-2-262654, JP-A-2-71262, JP-A-3-121449, JP-A-5-61166, JP-A-5-119449, and U.S. Pat. Nos. 4,814,262 and 4,980,275.

The amount thereof added is appropriately selected according to the intended application, and it is preferably on the order of 0.1 to 8 wt % on the basis of the solids content in the ink composition.

Antifading Agent

The ink composition of the present invention may employ various organic and metal complex antifading agents. The organic antifading agents include hydroquinones, alkoxyphenols, dialkoxyphenols, phenols, anilines, amines, indanes, chromans, alkoxyanilines, and heterocycles, and the metal complex antifading agents include nickel complexes and zinc complexes. More specifically, there can be used compounds described in patents cited in Research Disclosure, No. 17643, Items VII-I to J, ibid., No. 15162, ibid., No. 18716, page 650, left-hand column, ibid., No. 36544, page 527, ibid., No. 307105, page 872, and ibid., No. 15162, and compounds contained in general formulae and compound examples of typical compounds described in JP-A-62-21572, pages 127 to 137.

The amount thereof added is appropriately selected according to the intended application, and it is preferably on the order of 0.1 to 8 wt % on the basis of the solids content in the ink composition.

Conductive Salt

The ink composition of the present invention may contain, for the purpose of controlling discharge properties, a conductive salt such as potassium thiocyanate, lithium nitrate, ammonium thiocyanate, or dimethylamine hydrochloride.

Solvent

It is also effective to add a trace amount of organic solvent to the ink composition of the present invention in order to improve the adhesion to a recording medium.

Examples of the solvent include ketone-based solvents such as acetone, methyl ethyl ketone, and diethyl ketone, alcohol-based solvents such as methanol, ethanol, 2-propanol, 1-propanol, 1-butanol, and tert-butanol, chlorine-based solvents such as chloroform and methylene chloride, aromatic-based solvents such as benzene and toluene, ester-based solvents such as ethyl acetate, butyl acetate, and isopropyl acetate, ether-based solvents such as diethyl ether, tetrahydrofuran, and dioxane, and glycol ether-based solvents such as ethylene glycol monomethyl ether and ethylene glycol dimethyl ether.

In this case, it is effective if the amount thereof added is in a range that does not cause problems with the solvent resistance or the VOC, and the amount is preferably in the range of 0.1 to 5 wt % relative to the total amount of the ink composition, and more preferably 0.1 to 3 wt %.

High Molecular Weight Compound

The ink composition may contain various types of high molecular weight compounds in order to adjust film physical properties. Examples of the high molecular weight compounds include acrylic polymers, polyvinylbutyral resins, polyurethane resins, polyamide resins, polyester resins, epoxy resins, phenol resins, polycarbonate resins, polyvinylbutyral resins, polyvinylformal resins, shellac, vinylic resins, acrylic resins, rubber-based resins, waxes, and other natural resins. They may be used in a combination of two or more types. Among these, a vinylic copolymer obtained by copolymerization of an acrylic monomer is preferable. Furthermore, as a copolymer component of the high molecular weight compound, a copolymer containing as a structural unit a 'carboxyl group-containing monomer', an 'alkyl methacrylate ester', or an 'alkyl acrylate ester' may preferably be used.

In addition to the above, the composition may contain as necessary, for example, a leveling additive, a matting agent, a wax for adjusting film physical properties, or a tackifier in order to improve the adhesion to a recording medium such as polyolefin or PET, the tackifier not inhibiting polymerization.

Specific examples of the tackifier include high molecular weight tacky polymers described on pp. 5 and 6 of JP-A-2001-49200 (e.g. a copolymer formed from an ester of (meth) acrylic acid and an alcohol having an alkyl group with 1 to 20 carbons, an ester of (meth)acrylic acid and an alicyclic alcohol having 3 to 14 carbons, or an ester of (meth)acrylic acid and an aromatic alcohol having 6 to 14 carbons), and a low molecular weight tackifying resin having a polymerizable unsaturated bond.

Properties of Ink Composition

In the present invention, the ink composition preferably has a viscosity at 25° C. of no more than 50 mPa·s, and more preferably no more than 40 mPa·s. The viscosity is preferably 3 to 50 mPa·s, more preferably 5 to 40 mPa·s, and particularly preferably 7 to 30 mPa·s. Furthermore, the viscosity of the ink composition at the discharge temperature (preferably 25° C. to 80° C., and more preferably 25° C. to 50° C.) is preferably 3 to 15 mPa·s, and more preferably 3 to 13 mPa·s. With regard to the ink composition of the present invention, it is preferable that its component ratio is appropriately adjusted so that the viscosity is in the above-mentioned range. When the viscosity at room temperature is set to be high, even when a porous recording medium is used, penetration of the ink into the recording medium can be prevented, and uncured monomer can be reduced. Furthermore, ink spreading when ink droplets have landed can be suppressed, and as a result there is the advantage that the image quality is improved.

The surface tension of the ink composition of the present invention at 25° C. is preferably 20 to 35 mN/m, and yet more preferably 23 to 33 mN/m. When recording is carried out on various types of recording medium such as polyolefin, PET, coated paper, and uncoated paper, from the viewpoint of spread and penetration, it is preferably at least 20 mN/m, and from the viewpoint of wettability it is preferably not more than 35 mN/m.

(2) Inkjet Recording Method and Inkjet Recording Device

The ink composition of the present invention is used for inkjet recording.

The inkjet recording method of the present invention is a method for forming an image by discharging the ink composition of the present invention onto a recording medium (support, recording material, etc.) for inkjet recording and curing the ink by irradiating the ink composition so discharged onto the recording medium with actinic radiation.

More particularly, the inkjet recording method of the present invention comprises ($a^1$) a step of discharging the ink composition of the present invention onto a recording medium and ($b^1$) a step of curing the ink composition by irradiating the ink composition so discharged with actinic radiation, The inkjet recording method of the present invention comprises the steps ($a^1$) and ($b^1$) above and thus forms an image from the ink composition cured on the recording medium.

The step ($a^1$) of the inkjet recording method of the present invention may employ an inkjet recording device that will be described in detail below.

Inkjet Recording Device

An inkjet recording device used in the inkjet recording method of the present invention is not particularly limited, and any known inkjet recording device that can achieve an intended resolution may be used. That is, any known inkjet recording device, such as a commercial product, may be used in order to discharge an ink onto a recording medium in step ($a^1$) of the inkjet recording method of the present invention.

The inkjet recording device that can be used in the present invention is equipped with, for example, an ink supply system, a temperature sensor, and an actinic radiation source.

The ink supply comprises, for example, a main tank containing the ink composition of the present invention, a supply pipe, an ink supply tank immediately before an inkjet head, a filter, and a piezo system inkjet head. The piezo system inkjet head may be driven so as to discharge a multisize dot of preferably 1 to 100 pL, and more preferably 8 to 30 pL, at a resolution of preferably 320×320 to 4,000×4,000 dpi, more preferably 400×400 to 1,600×1,600 dpi, and yet more preferably 720×720 dpi. Here, dpi referred to in the present invention means the number of dots per 2.54 cm.

As described above, since it is desirable for the radiation curing type ink to be discharged at a constant temperature, a section from the ink supply tank to the inkjet head is thermally insulated and heated. A method of controlling temperature is not particularly limited, but it is preferable to provide, for example, temperature sensors at a plurality of pipe section positions, and control heating according to the ink flow rate and the temperature of the surroundings. The temperature sensors may be provided on the ink supply tank and in the vicinity of the inkjet head nozzle. Furthermore, the head unit that is to be heated is preferably thermally shielded or insulated so that the device main body is not influenced by the temperature of the outside air. In order to reduce the printer start-up time required for heating, or in order to reduce the thermal energy loss, it is preferable to thermally insulate the head unit from other sections and also to reduce the heat capacity of the entire heated unit.

When the ink composition or the inkjet recording ink composition of the present invention is discharged using the above mentioned inkjet recording device, the ink composition is preferably discharged after being heated to preferably 25° C. to 80° C., and more preferably 25° C. to 50° C., so as to reduce the viscosity of the ink composition to preferably 3 to 15 mPa·s, and more preferably 3 to 13 mPa·s. In particular, it is preferable to use the ink composition having an ink viscosity at 25° C. of no more than 50 mPa·s since a good discharge stability can be obtained. By employing this method, high discharge stability can be realized.

The radiation curing type ink composition such as the ink composition of the present invention generally has a viscosity that is higher than that of a normal ink composition or a water-based ink used for an inkjet recording ink, and variation in viscosity due to a change in temperature at the time of discharge is large. Viscosity variation in the ink has a large effect on changes in liquid droplet size and changes in liquid droplet discharge speed and, consequently, causes the image quality to be degraded. It is therefore necessary to maintain the ink discharge temperature as constant as possible. In the present invention, the control range for the temperature is desirably ±5° C. of a set temperature, preferably ±2° C. of the set temperature, and more preferably ±1° C. of the set temperature.

The step ($b^1$) of curing the discharged ink composition by irradiating the ink composition with actinic radiation is now explained.

The ink composition discharged onto the recording medium cures upon exposure to actinic radiation. This is due to an initiating species such as a radical, an acid, or a base being generated by decomposition of the polymerization initiator contained in the ink composition of the present invention by irradiation with actinic radiation, the initiating species functioning so as to make a polymerization reaction of a radically polymerizable compound take place and to promote it. In this process, if a sensitizing colorant is present together with the polymerization initiator in the ink composition, the sensitizing colorant in the system absorbs actinic radiation, becomes excited, and promotes decomposition of the polymerization initiator by contact with the polymerization initiator, thus enabling a curing reaction with higher sensitivity to be achieved.

The actinic radiation used in this process may include α rays, γ rays, an electron beam, X rays, UV rays, visible light, and IR rays. Although it depends on the absorption characteristics of the sensitizing dye, the peak wavelength of the actinic radiation is preferably 200 to 600 nm, more preferably 300 to 450 nm, and particularly preferably 350 to 420 nm.

Furthermore, in the present invention, the polymerization initiation system has sufficient sensitivity for low output actinic radiation. The actinic radiation is applied therefore so that the illumination intensity on the exposed surface is preferably 10 to 4,000 mW/cm$^2$, and more preferably 20 to 2,500 mW/cm$^2$.

As an actinic radiation source, a mercury lamp, a gas/solid laser, etc. are mainly used, and for UV photocuring inkjet a mercury lamp and a metal halide lamp are widely known. However, from the viewpoint of protection of the environment, there has recently been a strong desire for mercury not to be used, and replacement by a GaN semiconductor UV light emitting device is very useful from industrial and environmental viewpoints. Furthermore, LEDs (UV-LED) and LDs (UV-LD) have small dimensions, long life, high efficiency, and low cost, and their use as a photocuring inkjet light source can be expected.

Furthermore, light-emitting diodes (LED) and laser diodes (LD) may be used as the source of actinic radiation. In particular, when a UV ray source is needed, a UV-LED or a UV-LD may be used. For example, Nichia Corporation has marketed a violet LED having a wavelength of the main emission spectrum of between 365 nm and 420 nm. Furthermore, when a shorter wavelength is needed, U.S. Pat. No. 6,084,250 discloses an LED that can emit actinic radiation whose wavelength is centered between 300 nm and 370 nm. Furthermore, another UV-LED is available, and irradiation can be carried out with radiation of a different UV bandwidth. The actinic radiation source particularly preferable in the present invention is a UV-LED, and a UV-LED having a peak wavelength at 350 to 420 nm is particularly preferable.

The maximum illumination intensity of the LED on a recording medium is preferably 10 to 2,000 mW/cm$^2$, more preferably 20 to 1,000 mW/cm$^2$, and particularly preferably 50 to 800 mJ/cm$^2$.

The ink composition of the present invention is desirably exposed to such actinic radiation for preferably 0.01 to 120 sec., and more preferably 0.1 to 90 sec.

Irradiation conditions and a basic method for irradiation with actinic radiation are disclosed in JP-A-60-132767. Specifically, a light source is provided on either side of a head unit that includes an ink discharge device, and the head unit and the light source are made to scan by a so-called shuttle system. Irradiation with actinic radiation is carried out after a certain time (preferably 0.01 to 0.5 sec., more preferably 0.01 to 0.3 sec., and yet more preferably 0.01 to 0.15 sec.) has elapsed from when the ink has landed. By controlling the time from ink landing to irradiation so as to be a minimum in this way, it becomes possible to prevent the ink that has landed on a recording medium from spreading before being cured. Furthermore, since the ink can be exposed before it reaches a deep area of a porous recording medium that the light source cannot reach, it is possible to prevent monomer from remaining unreacted, and as a result the odor can be reduced.

Furthermore, curing may be completed using another light source that is not driven. WO99/54415 discloses, as an irradiation method, a method employing an optical fiber and a method in which a collimated light source is incident on a mirror surface provided on a head unit side face, and a recorded area is irradiated with UV light.

By employing such a recording method, it is possible to maintain a uniform dot diameter for landed ink even for various types of recording media having different surface wettability, thereby improving the image quality. In order to obtain a color image, it is preferable to superimpose colors in order from those with a low lightness. By superimposing inks in order from one with low lightness, it is easy for radiation to reach a lower ink, the curing sensitivity is good, the amount of residual monomer decreases, and an improvement in adhesion can be expected. Furthermore, although it is possible to discharge all colors and then expose them at the same time, it is preferable to expose one color at a time from the viewpoint of promoting curing.

In this way, the ink composition of the present invention is cured by irradiation with actinic radiation in high sensitivity to thus form an image on the surface of the recording medium.

In the present invention, the recording medium is not particularly limited, and a recording medium known as a support or a recording material may be used. Examples thereof include paper, paper laminated with a plastic (e.g. polyethylene, polypropylene, polystyrene, etc.), a metal plate (e.g. aluminum, zinc, copper, etc.), a plastic film (e.g. cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, polyvinylacetal, etc.), and paper or plastic film laminated or vapor-deposited with the above metal. In the present invention, as the recording medium, a non-absorbing recording medium may suitably be used.

In accordance with the present invention, it is possible to provide an ink composition that ensures long-term storage stability, has excellent continuous discharge properties, and for which an image obtained by curing has excellent color hue and adhesion to a substrate, an inkjet recording method employing the ink composition, and a printed material obtained by the inkjet recording method.

EXAMPLES

The present invention is explained in further detail by reference to Examples and Comparative Examples. However, the present invention should not be construed as being limited to these Examples.

'Parts' described below means 'parts by weight' unless otherwise specified.

Materials used in the present invention are as follows.

(F) IRGALITE BLUE GLVO (cyan pigment, manufactured by Ciba Specialty Chemicals (CSC), surface acid content: 18.0, surface base content: 34.0)

(F) CINQUASIA MAGENTA RT-335 D (magenta pigment, manufactured by Ciba Specialty Chemicals, surface acid content: 20, surface base content: 20.7)

(F) NOVOPERM YELLOW H2G (yellow pigment, manufactured by Clariant, surface acid content: 13, surface base content: 19)

(F) SPECIAL BLACK 250 (black pigment, manufactured by Ciba Specialty Chemicals, surface acid content: 15, surface base content: 10)

(F) KRONOS 2300 (white pigment (titanium oxide), manufactured by KRONOS, surface acid content: 11, surface base content: 33)

(F) Tipaque CR60-2 (white pigment (titanium oxide), manufactured by Ishihara Sangyo Kaisha Ltd., surface acid content: 8, surface base content: 25)

(B) FANCRYL 512A (corresponding to compound example M-11, manufactured by Hitachi Chemical Co., Ltd.)

(A) N-Vinylcaprolactam (manufactured by Aldrich)

(B) Actilane 421 (propoxylated neopentyl glycol diacrylate, manufactured by Akcros)

(D) TINUVIN 770DF (hindered amine, manufactured by Ciba Specialty Chemicals)

(B, D) Dimethylaminoethyl acrylate (DMA, manufactured by Osaka Organic Chemical Industry Ltd.)

(B) NK ester AMP-10G (phenoxyethyl acrylate, manufactured by Shin-Nakamura Chemical Co., Ltd.)

(B) KAYARAD DPCA-60 (caprolactone-modified dipentaerythritol hexaacrylate, manufactured by Nippon Kayaku Co., Ltd.)

(E) FIRSTCURE ST-1 (polymerization inhibitor, manufactured by ChemFirst)

(E) Hydroquinone monomethyl ether (manufactured by Seiko Chemical Co., Ltd.)

(C) Lucirin TPO (photopolymerization initiator, manufactured by BASF)

(C) Benzophenone (photopolymerization initiator, manufactured by Wako Pure Chemical Industries, Ltd.)

(C) IRGACURE 184 (photopolymerization initiator, manufactured by Ciba Specialty Chemicals)

(H) KF-353 (surfactant, manufactured by Shin-Etsu Chemical Co., Ltd)

(D, G) Disper BYK-168 (dispersant, manufactured by BYK Chemie, amine value 10 mg KOH/g, acid value 0 mg KOH/g)

(G) Solsperse 36000 (dispersant, manufactured by LUBRIZOL, acid value 45 mg KOH/g, amine value 0 mg KOH/g)

FIRSTCURE ITX (sensitizer, manufactured by ChemFirst)

Preparation of Cyan Mill Base A

| | |
|---|---|
| (F) IRGALITE BLUE GLVO | 300 parts by weight |
| (B) Actilane 421 | 500 parts by weight |
| (D, G) Disper BYK-168 | 200 parts by weight |

The components above were stirred and mixed to give a pigment ink. Preparation of a pigment mill base was carried out by putting the pigment ink into an M50 disperser motor mill (manufactured by Eiger) and dispersing using zirconia beads having a diameter of 0.65 mm at a peripheral speed of 9 m/s for 4 hours.

Preparation of White Mill Base B

| | |
|---|---|
| (F) KRONOS 2300 | 500 parts by weight |
| (B) Actilane 421 | 400 parts by weight |
| (D, G) Disper BYK-168 | 100 parts by weight |

The components above were stirred and mixed to give a pigment ink. Preparation of a pigment mill base was carried out by putting the pigment ink into an M50 disperser motor mill (manufactured by Eiger) and dispersing using zirconia beads having a diameter of 0.65 mm at a peripheral speed of 9 m/s for 4 hours.

Preparation of White Mill Base C

| | |
|---|---|
| (F) Tipaque CR60-2 | 500 parts by weight |
| (B) NK ester AMP-10G | 465 parts by weight |
| (G) Solsperse 36000 | 35 parts by weight |

The components above were stirred and mixed to give a pigment ink. Preparation of a pigment mill base was carried out by putting the pigment ink into an M50 disperser motor mill (manufactured by Eiger) and dispersing using zirconia beads having a diameter of 0.65 mm at a peripheral speed of 9 m/s for 4 hours.

Example 1

The components below were stirred using a high-speed water-cooled stirrer to give a cyan UV inkjet ink. The viscosity was 22 mPa·s.

Cyan Ink Composition

| | |
|---|---|
| (B) (F) (D, G) Cyan mill base A | 6.0 parts |
| (B) FANCRYL 512A | 31.2 parts |
| (A) N-Vinylcaprolactam | 14.0 parts |
| (B) NK ester AMP-10G | 31.2 parts |
| (B) KAYARAD DPCA-60 | 2.0 parts |
| (E) FIRSTCURE ST-1 | 1.94 parts |
| (C) Lucirin TPO | 8.5 parts |
| (C) Benzophenone | 3.0 parts |
| (C) IRGACURE 184 | 2.0 parts |
| (H) KF-353 | 0.06 parts |
| (B, D) Dimethylaminoethyl acrylate | 0.1 parts |

Example 2

The components below were stirred using a high-speed water-cooled stirrer to give a white UV inkjet ink. The viscosity was 23 mPa·s.

White Ink Composition

| | |
|---|---|
| (B) (F) (D, G) White mill base B | 40.0 parts |
| (B) FANCRYL 512A | 16.0 parts |
| (A) N-Vinylcaprolactam | 14.0 parts |
| (B) NK ester AMP-10G | 16.0 parts |
| (B) KAYARAD DPCA-60 | 2.0 parts |
| (E) FIRSTCURE ST-1 | 1.0 parts |
| (C) Lucirin TPO | 8.5 parts |
| (C) IRGACURE 184 | 2.0 parts |
| (H) KF-353 | 0.5 parts |

Example 3

The components below were stirred using a high-speed water-cooled stirrer to give a white UV inkjet ink. The viscosity was 21 mPa·s.

White Ink Composition

| | |
|---|---|
| (B) (F) (G) White mill base C | 40.0 parts |
| (B) FANCRYL 512A | 20.5 parts |
| (A) N-Vinylcaprolactam | 14.0 parts |
| (B) NK ester AMP-10G | 14.0 parts |
| (B) KAYARAD DPCA-60 | 2.0 parts |
| (E) FIRSTCURE ST-1 | 0.4 parts |
| (C) Lucirin TPO | 8.5 parts |
| (C) IRGACURE 184 | 2.0 parts |
| (H) KF-353 | 0.5 parts |
| (D) TINUVIN 770DF | 0.1 parts |

Example 4

The procedure of Example 3 was repeated except that (A) N-vinylcaprolactam was changed to 10.0 parts and (B) NK ester AMP-10G was changed to 18.0 parts, thus giving a white UV inkjet ink. The viscosity was 22 mPa·s.

Example 5

The procedure of Example 3 was repeated except that (A) N-vinylcaprolactam was changed to 5.0 parts and (B) NK ester AMP-10G was changed to 23.0 parts, thus giving a white UV inkjet ink. The viscosity was 23 mPa·s.

Example 6

The procedure of Example 3 was repeated except that, instead of (D) TINUVIN 770DF, (B, D) dimethylaminoethyl acrylate was added, thus giving a white UV inkjet ink. The viscosity was 21 mPa·s.

Example 7

The procedure of Example 3 was repeated except that (E) FIRSTCURE ST-1 was not added, thus giving a white UV inkjet ink. The viscosity was 21 mPa·s.

Example 8

The procedure of Example 3 was repeated except that, instead of (E) FIRSTCURE ST-1, hydroquinone monomethyl ether was added, thus giving a white UV inkjet ink. The viscosity was 21 mPa·s.

Comparative Example 1

The procedure of Example 3 was repeated except that (A) N-vinylcaprolactam was not added, (B) FANCRYL 512A was changed to 27.5 parts, and (B) NK ester AMP-10G was changed to 21 parts, thus giving a white UV inkjet ink. The viscosity was 27 mPa·s.

Comparative Example 2

The procedure of Example 3 was repeated except that (A) N-vinylcaprolactam was changed to 24.0 parts, and (B) NK ester AMP-10G was changed to 4.0 parts, thus giving a white UV inkjet ink. The viscosity was 20 mPa·s.

Comparative Example 3

The procedure of Example 3 was repeated except that (D) TINUVIN 770DF was not added, thus giving a white UV inkjet ink. The viscosity was 21 mPa·s.

Evaluation Conditions

The ink compositions of the Examples and Comparative Examples were maintained at 60° C. for 4 weeks.

The viscosity and the proportion of N-vinylcaprolactam decomposed were evaluated using these ink compositions. The proportion of N-vinylcaprolactam decomposed in the ink composition was measured using liquid chromatography, and the change from the peak area of N-vinylcaprolactam in the initial state was ascertained.

Viscosity Measurement Method

Measurement of viscosity in the examples was carried out using a Brookfield LVDV-I type B viscometer (manufactured by Brookfield) at 25° C. with a rotor rotational speed of 20 rpm.

For the change in viscosity after storage, the difference in viscosity between that before and that after storage was evaluated as follows.

Excellent Difference in viscosity was at most 2 mPa·sec.
Good: Difference in viscosity was greater than 2 mPa·sec but less than 5 mPa·sec.
Fair: Difference in viscosity was greater than 5 mPa·sec but less than 10 mPa·sec.
Poor: Difference in viscosity was equal to or greater than 10 mPa·sec.

Liquid Chromatography Measurement Method

The ink composition before and after aging was measured using a liquid chromatograph manufactured by Waters and an RP-18 liquid chromatograph column manufactured by Kanto Chemical Co., Inc. The peak areas of the N-vinylcaprolactam peaks before and after aging were compared, and the decrease (proportion decomposed) was calculated. The smaller the decrease, the more suppressed the decomposition.

Measurement Method for pH of Ink

After stirring 20 g of the ink composition and 20 g of distilled water, the mixture was allowed to stand at room temperature until the ink composition and the aqueous layer separated into two layers. The pH of the aqueous layer thus obtained was measured using an HM-25R pH meter (DKK-Toa Corporation) and defined as the pH of the ink composition.

Inkjet Image Recording Method

Recording with each ink composition before and after aging was carried out on a recording medium using an experimental inkjet recording device having a piezo type inkjet nozzle. The ink supply system comprised a main tank, a supply pipe, an ink supply tank immediately before an inkjet head, a filter, and a piezo type inkjet head, and a section from the ink supply tank to the inkjet head was thermally insulated and heated. Temperature sensors were provided on the ink supply tank and in the vicinity of the nozzle of the inkjet head, and the temperature was controlled so that the nozzle section was always at 45° C.±2° C. The piezo type inkjet head was driven so as to discharge multisize dots of 8 to 30 pL at a resolution of 720×720 dpi. The exposure system, the main scanning speed, and the discharge frequency were adjusted so that, after landing, UV light was focused to give an exposure area illumination intensity of 1,630 mW/cm$^2$, and irradiation started 0.1 sec. after the ink landed on the recording medium. The cumulative amount of light applied to an image was adjusted so as to be 4,500 mJ/cm$^2$. The UV lamp employed an HAN250NL high-cure mercury lamp (manufactured by GS Yuasa Corporation). Here, dpi referred to in the present invention denotes the number of dots per 2.54 cm. The recording medium employed an E5000 ester film (film thickness 125 µm, manufactured by Toyobo Co., Ltd.).

Color Hue Evaluation Method

In accordance with the above-mentioned inkjet recording method, solid printed images having an average film thickness of 12 µm for a printed area were formed using each ink composition before aging and each ink composition after aging, and a change in color hue between that before and that after aging the ink was visually evaluated.

Furthermore, in accordance with the above-mentioned inkjet recording method, a solid printed image having an average film thickness of 12 µm for a printed area was formed using the ink composition before aging and stored at 60° C. for 1 week, and a change in color hue between that before and that after aging the printed image was visually evaluated. Evaluation was made using the criteria below from the results of changes in color hue between that before and that after aging of the ink composition and the printed image.

Excellent: No change in color hue was observed either for the ink or the printed image.

Good: Slight change in color hue was observed in one of the ink or the printed image but in a range that did not cause any practical problem.

Fair: Changes in color hue were observed in both the ink and the printed image but in a range that did not cause any practical problem.

Poor: Obvious changes in color hue were observed in both or in one of the ink and the printed image.

Continuous Discharge Properties Evaluation Method

A line having a line width of 0.5 points was printed continuously for 30 minutes, the printed line was examined in terms of discontinuities, fading, and the occurrence of a mist around the line, and evaluation was made using the criteria below.

Excellent: There were no line discontinuities, fading, or mist at all. The continuous discharge properties were very good.

Good: There were no line discontinuities, but there were some slightly faded areas or slightly misty areas. The continuous discharge properties were good.

Poor: There were areas where the line was discontinuous, or there were areas with severe mist. The continuous discharge properties were poor.

Substrate Adhesion Evaluation Method: Crosshatch Test (EN ISO2409)

As a recording medium, PET having an adhesion promotion-treated surface (film thickness 125 µm, manufactured by Teijin DuPont Films Japan Ltd.) was used, and in accordance with the above-mentioned inkjet recording method, a solid printed image having an average film thickness of 12 µm for a printed area was printed. Following this, each printed material was subjected to a crosshatch test (EN ISO2409).

TABLE 1

|  | Mill base | N-Vinyl-caprolactam (parts by weight) | Viscosity (mPa·sec) | Change in viscosity after storage | pH of ink | Proportion decomposed (%) | Color hue | Continuous discharge properties | Adhesion |
|---|---|---|---|---|---|---|---|---|---|
| Ex. 1 | Cyan A | 14 | 22 | Excellent | 7.6 | 0 | Excellent | Excellent | 5B |
| Ex. 2 | White B | 14 | 23 | Excellent | 7.5 | 0 | Good | Excellent | 5B |
| Ex. 3 | White C | 14 | 21 | Excellent | 7.5 | 0 | Good | Excellent | 5B |
| Ex. 4 | White C | 10 | 22 | Excellent | 7.5 | 0 | Good | Excellent | 5B |
| Ex. 5 | White C | 5 | 23 | Excellent | 7.5 | 0 | Excellent | Good | 4B |
| Ex. 6 | White C | 14 | 21 | Excellent | 7.2 | 0 | Good | Excellent | 5B |
| Ex. 7 | White C | 14 | 21 | Good | 7.5 | 0 | Good | Excellent | 5B |
| Ex. 8 | White C | 14 | 21 | Good | 7.5 | 0 | Good | Excellent | 5B |
| Comp. Ex. 1 | White C | 0 | 27 | Good | 7.5 | 0 | Excellent | Poor | 3B |
| Comp. Ex. 2 | White C | 24 | 20 | Excellent | 7.5 | 0 | Poor | Excellent | 5B |
| Comp. Ex. 3 | White C | 14 | 21 | Poor | 6.5 | 30 | Poor | Excellent | 5B |

Example 9

Inkjet recording was carried out using the ink of Example 3 in the same manner as in the above-mentioned inkjet recording except that, after landing, UV light was focused to give an exposure area illumination intensity of 350 mW/cm$^2$ and a cumulative light intensity on an image of 1,500 mJ/cm$^2$, and the lamp employed an NCCU033 UV-LED lamp (manufactured by Nichia Corporation). There were no dots missing in the image thus obtained, and a vivid image having a film thickness of 12 μm was formed. Furthermore, color hue, continuous discharge properties, and adhesion were evaluated in the same manner as above, and the same results as those of Example 3 given in Table 1 were obtained.

Example 10

Inkjet recording was carried out using the ink of Example 3 in the same manner as in the above-mentioned inkjet recording except that, after landing, UV light was focused to give an exposure area illumination intensity of 450 mW/cm$^2$ and a cumulative light intensity on an image of 8,000 mJ/cm$^2$, and the lamp employed an SHP270W super high pressure mercury lamp (manufactured by PHOENIX Electric Co., Ltd.), which is generally used for a projector, etc. There were no dots missing in the image thus obtained, and a vivid image having a film thickness of 12 μm was formed. Furthermore, color hue, continuous discharge properties, and adhesion were evaluated in the same manner as above, and the same results as those of Example 3 given in Table 1 were obtained.

What is claimed is:

1. An ink composition comprising:
   (A) an N-vinyllactam;
   (B) a radically polymerizable compound having a dicyclopentanyl structure, a dicyclopentenyl structure, or an adamantyl structure;
   (C) a polymerization initiator; and
   (D) a hindered amine compound;
   the content of the N-vinyllactam (A) being less than 15 wt % of the total weight of the ink composition.

2. The ink composition according to claim 1, wherein the polymerization initiator (C) comprises a radical polymerization initiator.

3. The ink composition according to claim 1, wherein it further comprises (E) a radical polymerization inhibitor.

4. The ink composition according to claim 3, wherein the radical polymerization inhibitor (E) is a nitroso compound.

5. The ink composition according to claim 1, wherein it further comprises (F) a colorant and (G) a dispersant.

6. The ink composition according to claim 1, wherein the N-vinyllactam (A) is N-vinylcaprolactam.

7. The ink composition according to claim 1, wherein it further comprises (F) a colorant.

8. The ink composition according to claim 7, wherein the colorant (F) is a white pigment.

9. The ink composition according to claim 8, wherein the white pigment is titanium oxide.

10. The ink composition according to claim 1, wherein it further comprises (G) a dispersant.

11. The ink composition according to claim 10, wherein the dispersant (G) is an acidic dispersant.

12. The ink composition according to claim 10, wherein the dispersant (G) is a polymeric dispersant whose acid value is larger than its amine value.

13. The ink composition according to claim 1, wherein the N-vinyllactam (A) is contained at least 5 wt % but less than 15 wt % of the total weight of the ink composition.

14. The ink composition according to claim 1, wherein it is for inkjet recording.

15. The ink composition according to claim 1, further comprising titanium oxide and a polymeric dispersant whose acid value is larger than its amine value.

16. The ink composition according to claim 1, wherein the radically polymerizable compound having a dicyclopentanyl structure, a dicyclopentenyl structure, or an adamantyl structure (B) is a compound selected from the group consisting of (M-1) to (M-38):

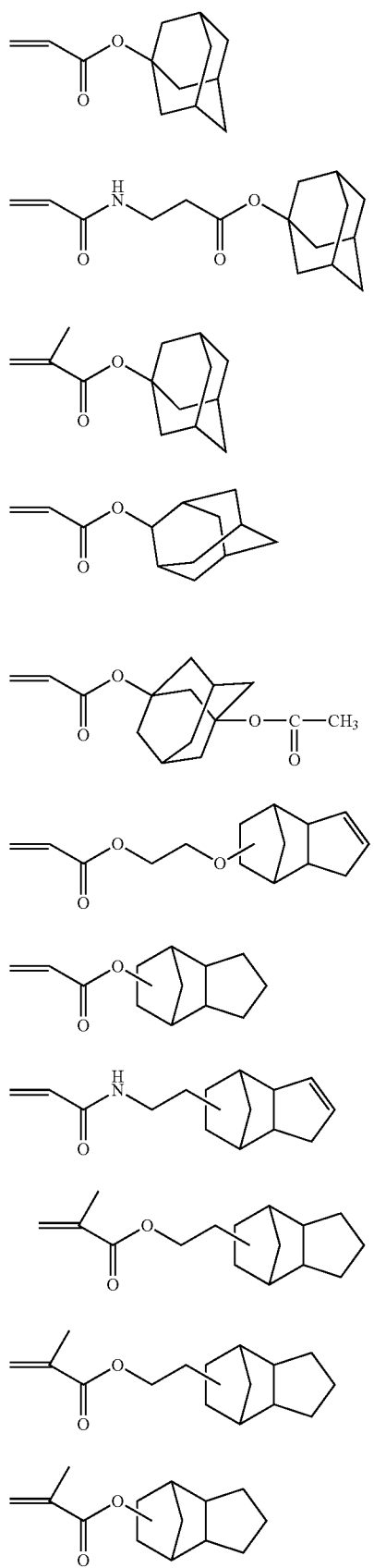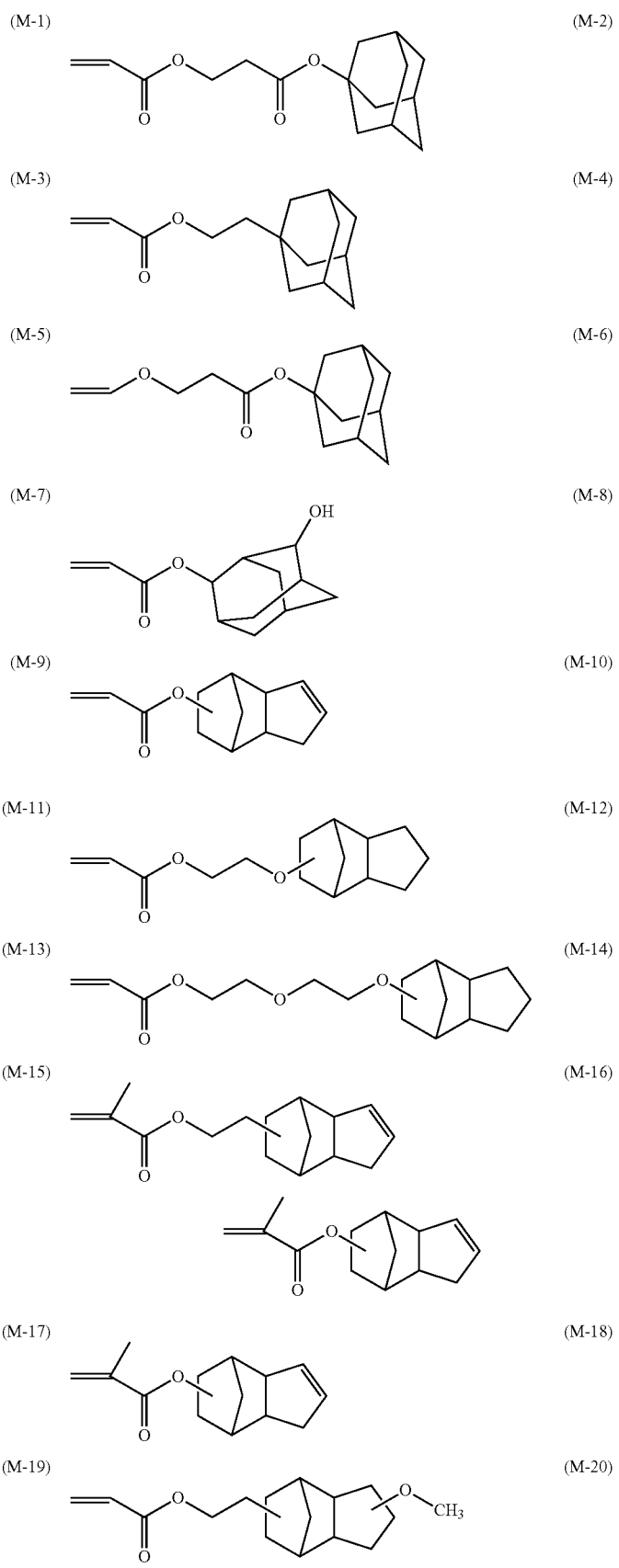

(M-21) 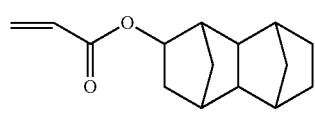
(M-22) 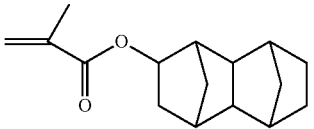
(M-23) 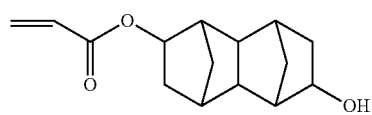
(M-24) 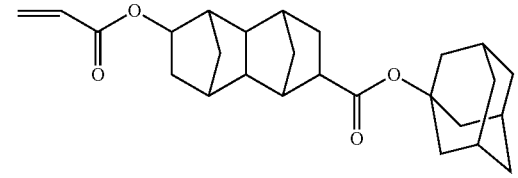
(M-25) 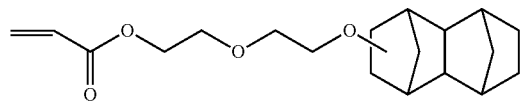
(M-26) 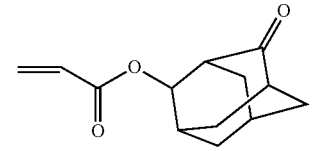
(M-27) 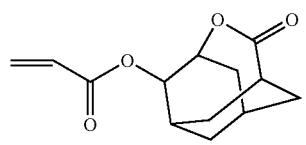
(M-28) 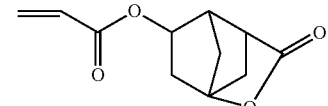
(M-29) 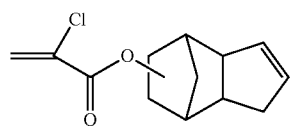
(M-30) 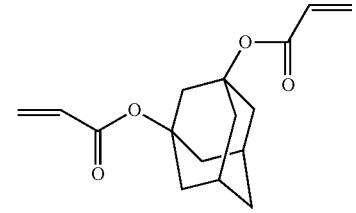
(M-31) 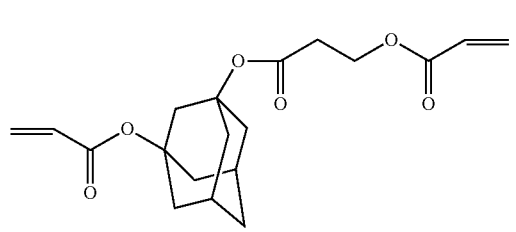
(M-32) 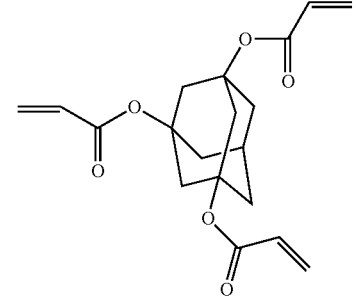
(M-33) 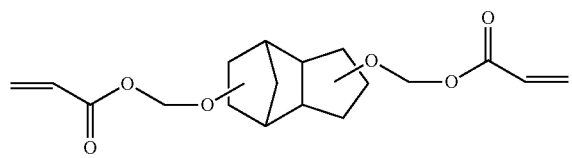
(M-34) 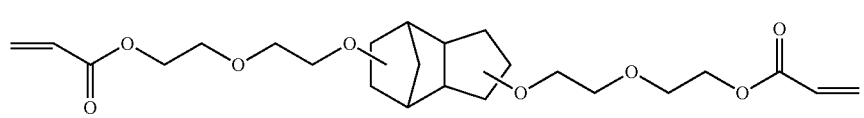

-continued (M-35)
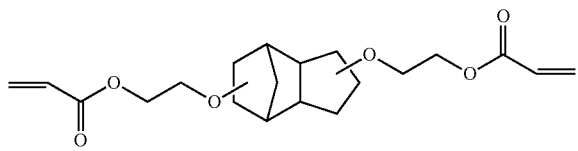

(M-36)
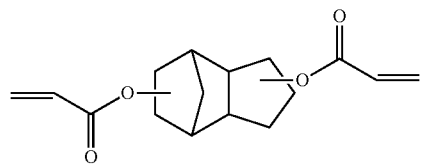

(M-37)
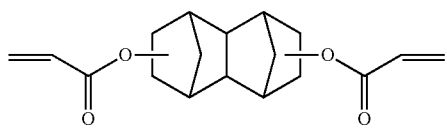

(M-38)
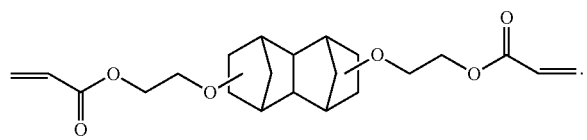

17. The ink composition according to claim 16, wherein the radically polymerizable compound having a dicyclopentanyl structure, a dicyclopentenyl structure, or an adamantyl structure (B) is (M-11).

18. The ink composition according to claim 1, wherein the ink composition is a non-aqueous composition.

19. The ink composition according to claim 18, wherein, after stirring the same weight amount of the ink composition and distilled water, the pH of the separated aqueous layer is at least 7.

20. An inkjet recording method comprising:
($a^1$) a step of discharging the ink composition according to claim 1 onto a recording medium; and
($b^1$) a step of curing the ink composition by irradiating the discharged ink composition with actinic radiation.

21. The inkjet recording method according to claim 20, wherein the actinic radiation is UV radiation having a peak light emission wavelength in the range of 350 to 420 nm and is emitted by a UV radiation-emitting light-emitting diode that gives a maximum illumination intensity on the surface of a recording medium of 10 to 2,000 mW/cm$^2$.

22. A printed material recorded by the inkjet recording method according to claim 20.

* * * * *